United States Patent [19]
Javan

[11] 4,410,992
[45] Oct. 18, 1983

[54] GENERATION OF PULSED LASER RADIATION AT A FINELY CONTROLLED FREQUENCY BY TRANSIENT REGERATIVE AMPLIFICATION

[75] Inventor: Ali Javan, Cambridge, Mass.

[73] Assignee: Laser Science, Inc., Cambridge, Mass.

[21] Appl. No.: 134,227

[22] Filed: Mar. 26, 1980

[51] Int. Cl.³ .............................................. H01S 3/13
[52] U.S. Cl. ....................................... 372/32; 372/20; 372/25
[58] Field of Search ..................... 331/94.5 C, 94.5 M, 331/94.5 S

[56] References Cited

U.S. PATENT DOCUMENTS

| | | | |
|---|---|---|---|
| 3,740,664 | 6/1973 | Freiberg et al. | 331/94.5 S |
| 3,747,004 | 7/1973 | Sasnett | 331/94.5 S |

Primary Examiner—William L. Sikes

[57] ABSTRACT

A pulsed laser system capable of producing pulses of radiation at relatively high peak power at a single resonator mode, said system comprising a master laser oscillator capable of producing a beam of radiation at a desired frequency to be introduced to a power laser, a radiation-responsive pulsed power laser oscillator including an optical resonator formed by a set of reflectors, said laser adapted to receive periodic application of a voltage pulse, said optical resonator arranged to receive said introduced beam at least during the periodic application of said voltage pulse to said power laser whereby the frequency of radiation emitted by said power laser can be determined by the frequency of said introduced beam, monitoring means acting between pulses of said power laser to optically monitor the resonator cavity of said power laser to determine the frequency of the resonator mode of said power laser and produce a signal dependent upon said frequency, and stabilizing means responsive to said signal of said monitoring means to maintain the center frequency of the mode of said power laser in close coincidence with the frequency of said master oscillator. By use of a tunable master oscillator and unique means for maintaining the mode of the master oscillator and power laser oscillator in near coincidence, a relatively high peak power tunable pulsed laser system is achieved. By use of the output of the power laser as probing radiation a unique Lidar system is achieved. Important further arrangements for achieving the above are also presented.

32 Claims, 19 Drawing Figures

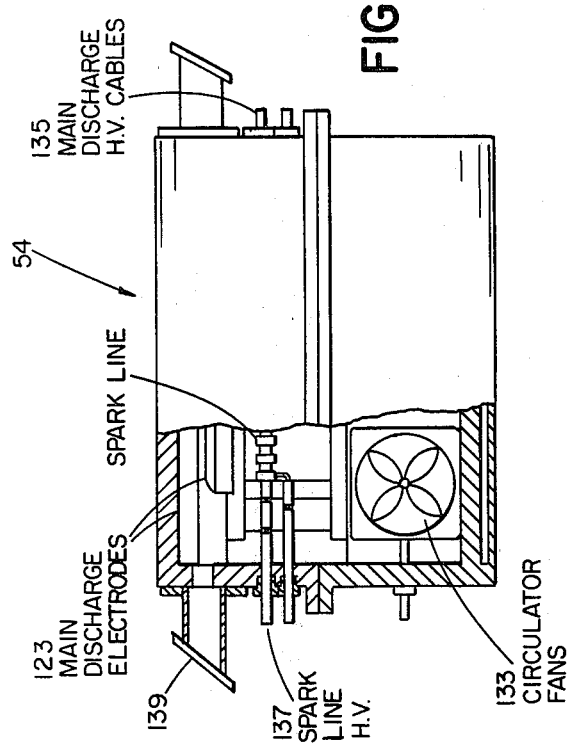
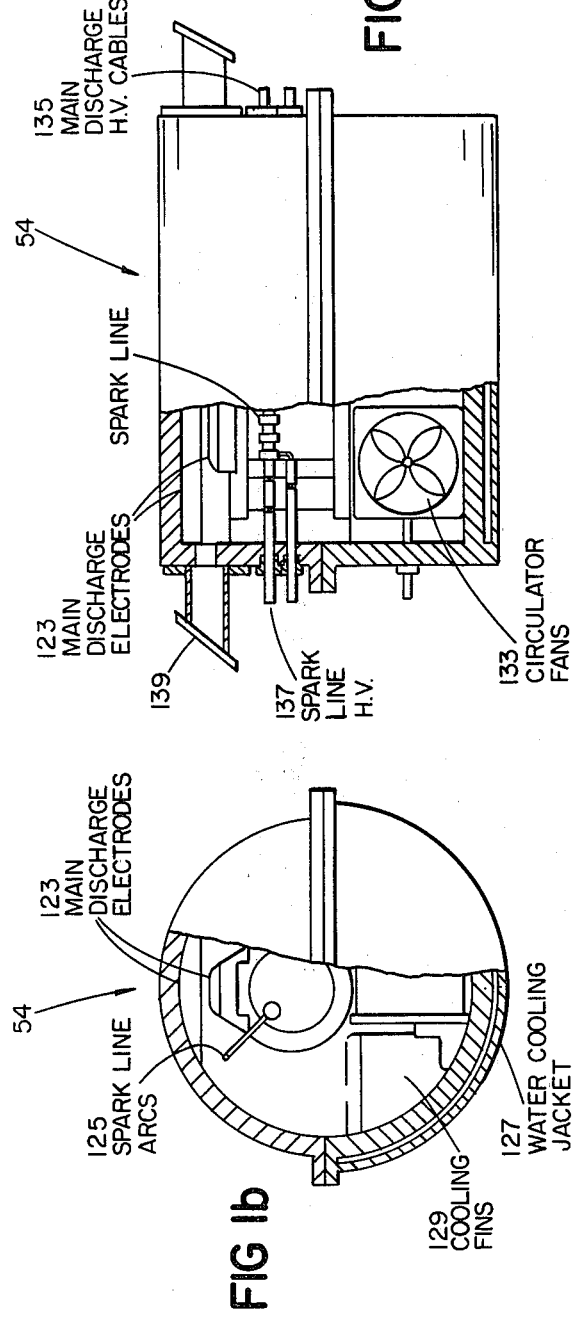
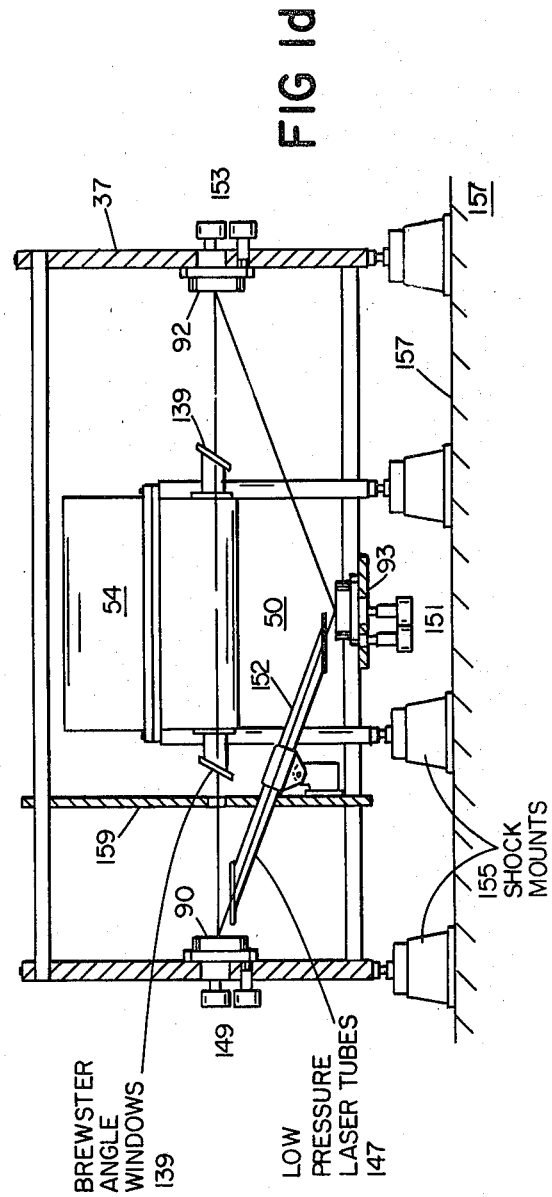

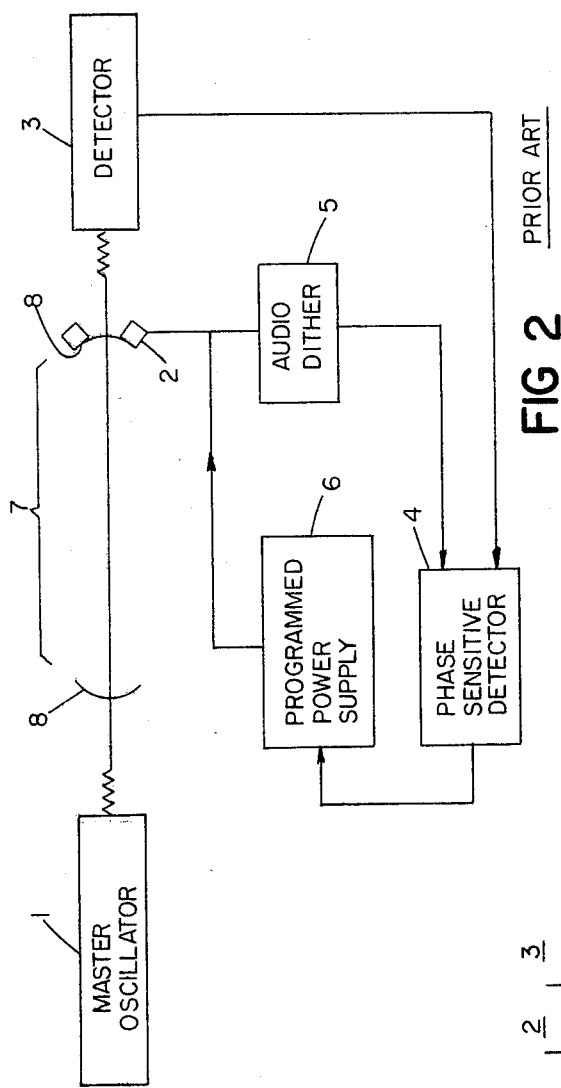
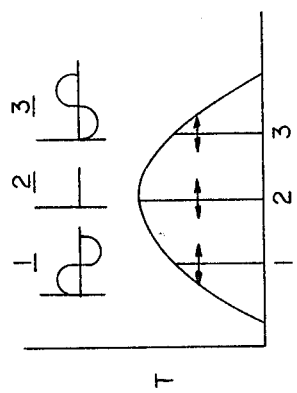
FIG 2 PRIOR ART
FIG 2a

GENERATION OF PULSED LASER RADIATION AT A FINELY CONTROLLED FREQUENCY BY TRANSIENT REGERATIVE AMPLIFICATION

INTRODUCTION

Since early in the 1960's when lasers became a reality, low energy gas lasers have offered highly monochromatic output radiation at well-defined frequencies. These have had a revolutionary impact in high resolution applications where narrow line width atomic or molecular resonances are probed or heavily excited by the monochromatic laser radiation. Lasers with spectral widths below one part in $10^{14}$ and long term frequency stability in the range of one part in $10^{11}$ (or better) can be made. Other developments of the past several years have lead to frequency tunable lasers with spectral purities adequate for high resolution application. The power output of these lasers however range from a fraction of a milliwatt to a fraction of one watt.

The past decade of development has also provided the technology for lasers operating at high power. A multikilowatt CW or repetitively pulsed gas laser can be made to operate steadily over periods of days or longer, while lasers with yet sizably higher CW output power are possible. The spectral output of high power lasers, however, is relatively broad, often consisting of several simultaneously oscillating transitions with considerable multimoding, frequency drift and jitter. In view of this broad spectral width, such high power lasers are mainly used for applications where high resolution laser frequency characteristics are unimportant, such as: welding, heat treating and metal cutting. In these cases, the high-power laser radiation serves as a carrier of a sizable energy to produce intense local heating.

Recent advances have shown the possibility of several large-scale laser applications that are of considerable national interest—but a full realization of these will depend on the availability of special frequency tunable high-power lasers with high-quality frequency characteristics. Some of these emerging applications require high-power output radiation at specified frequencies in the infrared with a frequency purity and long-term stability better than one hundred, fifty or, in some cases, several MHz. The availability of these lasers, reliably operating over long periods of time and with minimum service requirements, will have unquestionably revolutionary impact in these emerging applications.

For LIDAR applications available energetic pulsed lasers enable high peak power to be obtained, but the pulses generally do not contain radiation of high frequency purity and the pulses are generally limited to frequencies corresponding to the peak of the amplifying band. There are many potential applications, for instance in LIDAR spectroscopy, for pulsed lasers operating off of the peak of the amplifying band, if high frequency purity and stability can be achieved. Especially desirable would be such a laser system that is readily tunable. Even in the region of the peak of the amplifying band there is need for a stabilizing system which ensures single mode oscillation at a selected line.

In relation to remote sensing of pollutants, there is a need for lasers for such missions as:

(a) differential absorption with ground reflections providing altitude discrimination by observing pressure broadened pollutant line shapes;

(b) differential absorption Lidar based on atmospheric backscattering, providing altitude discriminations by ranging; and (c) differential absorption measurements between two satellites to obtain coverage over solar occulations, for stratospheric measurements.

For such missions, the transmitter laser should have a frequency spread and long term frequency stability of better than one hundred MHz.

SUMMARY OF INVENTION

Transient Regeneration Amplification (TRA)

According to the invention it has been realized that by injecting a pulsed gas laser in the initial transient time after the pulsed laser is suddenly switched on, and by terminating the pulse before onset of self-oscillation of the laser in the region of maximum gain, that substantial output radiation at frequencies far removed from the frequency of maximum gain of the laser can usefully be obtained. The radiation is limited to frequencies corresponding to resonator modes, and requires that the injection radiation correspond to such a frequency. Furthermore it is realized that by optical monitoring of the pulsed laser resonator, its mode can be determined and the operation can be stabilized and made to track the tuning of the injected radiation (a system useful also in the region of maximum gain). In particular it is realized that stabilizing loops of both the power laser and the injecting master oscillator can be locked together to achieve stabilization and control by rf tuning. The operability of this novel system follows from the following considerations.

If a laser oscillator gain is rapidly switched on, before the steady state oscillation is reached, the gain of the medium will be above the resonator losses over the entire amplifying band. Once the steady state is reached, however, the overall gain of the amplifier decreases to a point where, at its peak gain, the gain will equal the resonator loss (and hence by then in frequency regions far removed from the peak the gain will be far less than the resonator loss).

According to the invention, after the amplifier gain is rapidly switched on, and prior to the time that appreciable oscillation at peak gain occurs, the laser system can be employed as a power amplifier of an injected radiation with regenerative feedback (i.e. amplification with multiple reflections caused by resonator mirrors). This is possible over the entire bandwidth of the amplifier including frequencies appreciably removed from the peak gain. In such a system, by introducing into the resonator a weak signal at a frequency corresponding to a resonator mode of the amplifier laser at early times when the gain is switched on, it is possible to cause the buildup of oscillation at the frequency of the centerline of that mode for a short duration. Depending upon the initial intensity of the radiation introduced into the resonator as well as the gain of the amplifier medium at that frequency (compared to the peak gain) it is possible to extract a sizable portion of the energy stored in the amplifier at the frequency of the mode. This occurs in the transient buildup time before domination by self-oscillation of the laser medium in the frequency region of its maximum gain. The larger the intensity of the introduced signal (at frequency removed from maximum gain) the longer will be the delay of onset of the laser's own self oscillation and the greater will be the energy extracted at the new frequency. In a practical system the excitation of the laser medium is switched off prior to the onset of self oscillation, thus producing a laser output radiation with substantial purity determined by (but not necessarily precisely equal to) the frequency of the initial signal introduced into the resonator, and free from radiation caused by laser self-oscillation.

From this description it is to be noted that a regenerative amplification (TRA) in the early times after the gain is switched on can occur only for an input radiation substantially matched with the frequency of any resonator mode lying within the amplifier gain profile. The lower the amplifier gain is at the frequency of the mode, the higher must be the intensity of the radiation initially introduced for a substantial energy extraction at the desired frequency. Consider a situation in which the frequency of an incident radiation is substantially detuned from the center frequency of a resonator mode. In such a case the regeneration will not be complete and excessively large input radiation will be required for the excitation of that mode. According to the invention an automatic mode control system is provided in which an optical means is employed to monitor the resonator cavity to determine the frequency of the resonator mode so that (a) from pulse to pulse drift of the resonator mode from the frequency of the introduced radiation is corrected and (b) when the frequency of the introduced radiation is tuned, the resonator mode is automatically tuned so that it remains in near coincidence with the frequency of the introduced radiation. In most practical systems both (a) and (b) are vital, without which frequent manual adjustment will be necessary to bring the oscillator mode in near coincidence with the introduced radiation.

According also to the invention a novel specific multi-atmospheric $CO_2$ transient regenerative amplifier (TRA) master oscillator system is provided in which the high-quality frequency characteristic (at a high-average output power) can be obtained and totally controlled by the low-average-power master oscillator. This super regenerative power amplifier is based on the above-described concept of the transient regenerative amplification process which offers a very large power gain in excess of $10^8$ or $10^9$. Specifically this very large power gain is obtained by injecting a weak input radiation into a gain-switched regenerative $CO_2$ amplifier at its transient build-up time. In one embodiment, the multi-atmospheric gain-switched regenerative $CO_2$ amplifier is broadly tuned to the frequency region of interest; the finely-tuned master oscillator radiation, tuned to the appropriate frequency, is then coupled to the regenerative power amplifier. This incident driving radiation will cause the laser energy extraction from the regenerative power amplifier to occur at a single mode near the driving master oscillator frequency. With appropriate master oscillator and super-regenerative amplifier, reliable pulse-to-pulse frequency-reproducible radiation can be obtained at a high average power at a tunable frequency and with better than 100 MHz frequency spread and long-term stability.

Several alternatives are employed for the master oscillator. One of these is based on the well-known generation of a tunable microwave side-band on the output of a stable CW (or pulsed) low-pressure line-tunable low-power (several watts) $CO_2$ laser. Another is a novel combination of a low-average-power tunable frequency multi-atmospheric gain-switched master oscillator and a special frequency filter system; this combination produces finely controlled monochromatic radiation pulses at a power level amply adequate to drive the super-regenerative amplifier.

A mini E beam pumped C.W. laser as the master oscillator can provide high peak injection power at lines far removed from the lines of maximum gain.

According to the invention multi-atmospheric lasers for the tunable master oscillator utilize isotopically-enriched $CO_2$ gas; they are closed-cycle and capable of operating for hundreds of hours with a minimum service requirement; they are equipped with catalytic $CO_2$ regeneration and on-line gas purification, with full qualifications for field operation; for compactness and consistency with the use of the rare $CO_2$ isotopic species, the lasers are designed for a minimum internal volume.

The regenerative power amplifiers can be operated as tunable-frequency high-power oscillators (without the driving master oscillator). In this mode of operation, the high-power laser frequency spread and long-term frequency stability will be about 2000 MHz. A superheterodyne method will be employed to provide an automatic frequency control for the elimination of the long-term thermal drift.

An important further feature of the transient regenerative power amplification is that, with an appropriate multi-frequency master oscillator, it is possible to extract the laser energy at several simultaneously oscillating frequencies. The injection laser output consists of several closely spaced frequencies (about one hundred MHz apart), to sample and probe (with each transmitted laser pulse) an absorption line at several preselected frequencies from within its line profile. Based on this approach, a generalized differential absorption measurement is possible for line profile studies.

Further important features of the invention will appear in the following description of preferred embodiments.

Finally, the invention provides a LIDAR system in which a chirp-free pulse from a pulsed energetic laser is used as the probing radiation.

Prior Art in Relation to Injection

In the prior art a low pressure CW gain tube has often been introduced inside a resonator of an energetic pulsed laser. In this system the resonator mode lying within the narrow gain profile of the low pressure gain tube is selectively favored for laser self-oscillation to occur. Note that in this system radiation output of the laser system will occur only at frequencies in the region of maximum gain. Subsequent work has employed the low pressure gain tube as part of an external laser oscillator, with mirrors, and its output has been introduced into the resonator of the pulsed laser system to study the mode selection limited to the region of the pulsed amplifier maximum gain. The experiment employed manual control to bring the resonator mode into near coincidence with the frequency of the introduced signal.

Lachambre, et al, IEEE Journal of Quantum Electronics, Vol. QE-12, No. 12, December 1976, Injection Locking and Mode Selection in TEA-$CO_2$ Laser Oscillators.

DRAWINGS OF EMBODIMENTS

FIGS. 1b and 1c are end and side views, partially cut away, of the TEA plasma chamber employed in the embodiment of FIG. 1;

FIG. 1d is a side view of the TEA resonator of FIG. 1, incorporating the plasma chamber of FIGS. 1b and 1c;

FIG. 2 is a diagram of a prior art sensing and stabilizing technique;

GENERAL BACKGROUND FOR EMBODIMENTS

Figure 1:
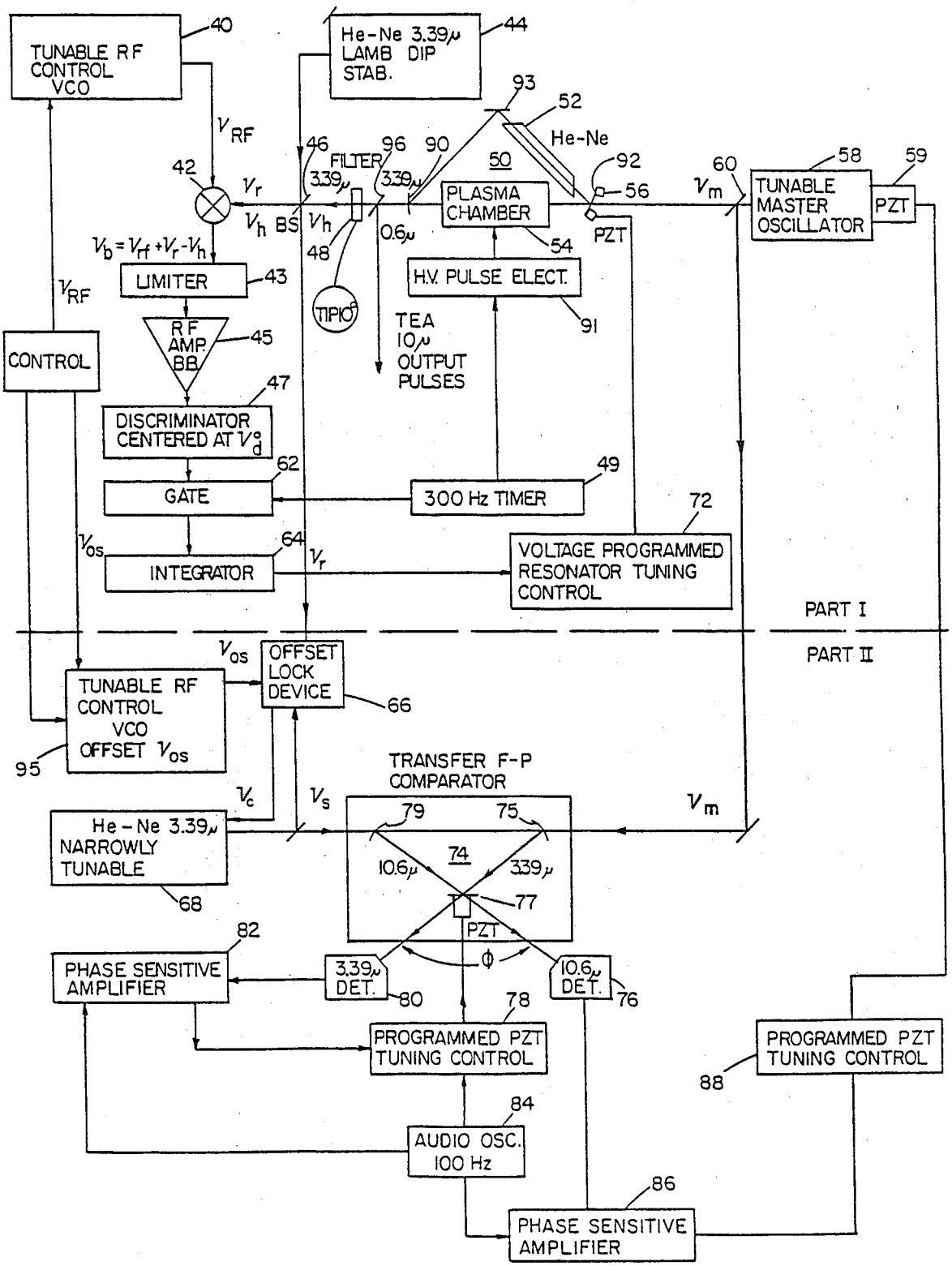
FIG. 1 shows the preferred embodiment of a complete control system for obtaining a stable, tunable monochromatic pulsed output from a TEA $CO_2$ laser employing transient regenerative amplification (TRA)

The laser system of FIGS. 1-9 consists of a finely-controlled repetitively-pulsed high pressure $CO_2$ laser in which UV photopreionization of an organic seed-gas is used to produce a uniform high-density $CO_2$ plasma. For details of such preionization, reference is made to U.S. Pat. No. 3,934,212 Javan, A. and Levine, J. S.; Feasibility of Producing Laser Plasmas via Photoionization, IEEE J.Q.E. Vol. QE-8 #11, 1972 and Levine, J. S. and Javan, A.; Observation of Laser Oscillation in a One Atmosphere $CO_2$-$N_2$-He Laser Pumped by an Electrically Heated Plasma Generated via Photoionization Appl. Phys. Letters Vol. 22, #2, 1973. The transient regenerative amplification (TRA) process at a tunable frequency is employed to extract the laser energy from the repetitively pulsed high intensity $CO_2$ laser at a tunable single-mode frequency. An external precision frequency-tunable CW $CO_2$ laser at a low output power is used as a driver master-oscillator for the TRA laser (When the system is used in Lidar and Lidar-like applications, the external master oscillator can also provide the local oscillator radiation in the heterodyne receiver system.)

When employing a closed-cycle high pressure isotopic pulsed $CO_2$ laser, operated at a high repetition rate, the characteristics needed for Lidar measurement of pollutants from ground base and aircraft can be achieved. Important to the system is to achieve an automatic frequency-tracking and accurate calibration, to provide a finely-controlled continuous frequency-tuning over broad gain-bandwidth of the overlapping pressure-broadened isotopic $CO_2$ lines.

The demands upon such tracking and control system are great. The monochromatic laser energy extraction at a tunable frequency via TRA demands the utilization of an external driver master oscillator. The external master oscillator must be in a configuration totally decoupled (radiatively) from the high intensity pulsed $CO_2$ laser. Also, one must maintain, over a long time period, the center frequency of one of the resonator-modes of the intense repetitively pulsed $CO_2$ laser in a close coincidence with the frequency of the external driver master-oscillator. Furthermore, important refractive index changes, caused by the intense current pulses in the $CO_2$ plasma and by population changes in the gain medium, can result in frequency chirping and pulse-to-pulse frequency fluctuations. The tracking system must be capable of tolerating such occurrences while maintaining stably the desired center frequency.

The present invention provides a means for dealing with these requirements and enables extraction of the TRA laser energy at a single-mode tunable frequency at a pulse-to-pulse long-term frequency-stability of several MHz. Such a long-term frequency stability is essential in high resolution Lidar measurements of pollutants as well as in laser chemistry and the like.

According to the invention, at a line-center frequency, it is possible to obtain a single-mode operation in which the frequency purity of each laser pulse is better than several hundred KHz; chirping in each pulse can be reduced to values as low as several hundred KHz per $\mu$Sec. By also incorporating the system shown in my copending application, Ser. No. 939,993, a frequency purity as low as one hundred KHz is obtainable, at pulse energies possibly exceeding several Joules. This is of considerable importance in Doppler wind velocity measurements at velocities of 1 meter/sec. and higher.

A precision tunable master-oscillator is also needed to drive the TRA laser system. The tunable master oscillator can be a line tunable CW $CO_2$ laser followed by an electrooptical modulator at a tunable microwave frequency. In this case tunable microwave side-bands of the line tunable $CO_2$ laser resonator is used as the master oscillator. Alternatively, a precision tunable miniature e-beam-sustained high pressure $CO_2$ laser, employing a low-Fresnel number tunable resonator can be employed in the embodiment.

TRA - $CO_2$ Tunable Master Oscillator

FIG. 1 shows a transient regenerative amplification (TRA) stable pulsed $CO_2$ laser 50, 54 an external master oscillator 58 and a novel tracking and control system. Before explaining the tracking and control system in detail, the lasers employed in the system will be described. The master oscillator may comprise the known low pressure $CO_2$ laser, line tunable, with means for forming a tunable microwave sideband of the stable $CO_2$ laser output radiation, at milliwatts of power as the injected signal. For spectroscopic probing at frequencies far from peak of resonance or at lines having very low gain a more energetic master oscillator such as the E beam laser of FIG. 1a may be employed.

Figure 1A:
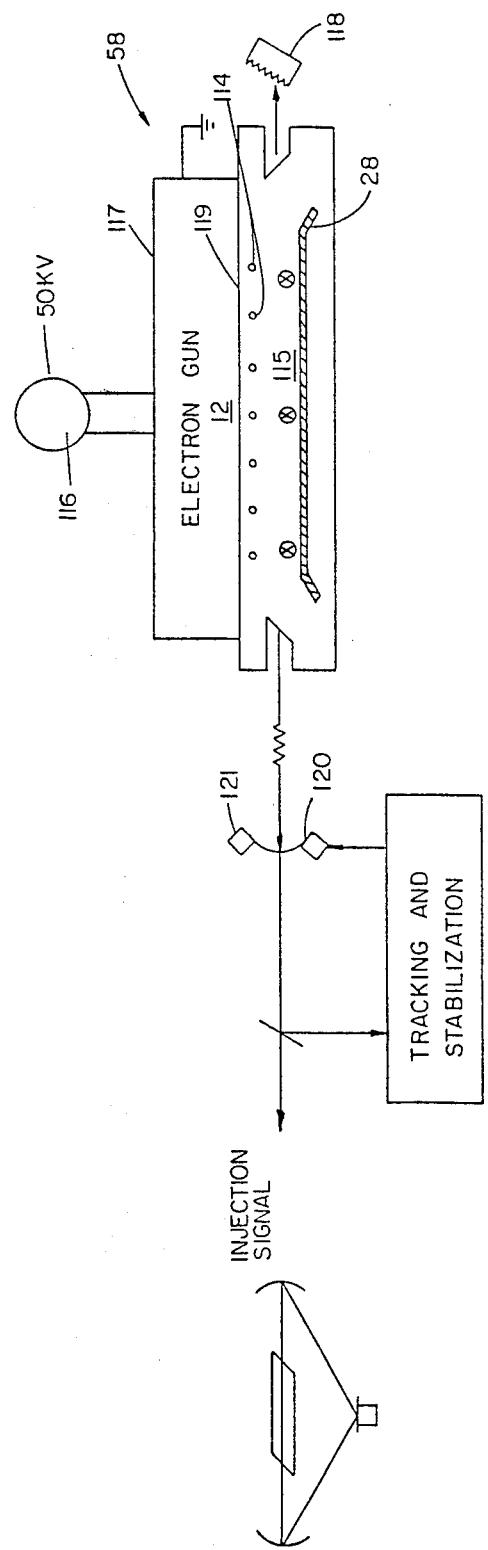
FIG. 1a is a diagram of a mini-E beam laser employed as the master oscillator of FIG. 1.

Referring to FIG. 1a, the master oscillator is an electron beam-pumped high-pressure CW $CO_2$ laser. The active medium in master oscillator laser is a mixture of $CO_2$, $N_2$ and He in the proportions of 1 to 1 to 8. The total operating pressure is on the order of three atmospheres. The resonator for the electron beam pumped laser consists of a diffraction grating 118 arranged in Littrow configuration (to be used for $CO_2$ laser line selection) and partially transmitting curved mirror 20 whose position may be finely adjusted, by means of a PZT crystal 121. The plasma chamber 117 for the electron beam gun contains an open grid cathode 114 covering the exit foil 119 of the plasma cathode electron gun. The grid cathode permits transmission of a sizeable fraction of the electron beam from the plasma cathode gun into the active medium region 115 which is defined as the space between the cathode grid and solid anode 28. A voltage is applied between anode 28 and cathode 114 to energize the plasma formed by secondary electrons generated in the $CO_2$ gas. This energized gas creates a population inversion and oscillation is obtained on rotational transitions in the $CO_2$. Because of the high pressure of the gas, pressure-broadening is very substantial and a high degree of tunability within each line is achieved, on the order of 15 gigahertz.

The electron gun used in FIG. 1a need not necessarily be of the plasma cathode type. The more generally available electron beam gun is of the hot cathode type, which also may be used. Hot cathode electrode beam guns are commercially available in the configuration of interest, that is of relatively short length on the order of 10 cm. and small cross-section on the order of a few mm. wide electron beam.

Master Oscillator Injection Of Pulsed Power Laser

Output from the CW electron beam pumped laser 58 is directed into a ring resonator 50 containing a high repetition rate, high pressure TEA plasma chamber 54. The TEA laser chamber operates at a total pressure of three atmospheres in order to have a band width comparable to that of the electron beam pumped master oscillator 58. The controls provide for a repetition rate of 300 hertz in this TEA laser. The ring resonator 50 is finely tuned by means of PZT element 56. The frequencies of the master oscillator 58 and the resonant frequency of the ring resonator 50 are equalized by means of the tracking and stabilization apparatus, described below. The result of the tracking and stabilization apparatus is to finely control, by means of PZT crystals, the resonator 50 of the TEA injected laser. By means of transient injection locking, with this system a high peak power, narrow band, tunable pulse radiation is obtainable over the 9 and 10 micron bands of $CO_2$.

TEA Laser Details

The acronym "TEA" refers to a transverse excited atmospheric pressure laser. Transverse excitation is introduced into the gas of the TEA laser by means of an electric field applied transversely to the optical axis of the laser, hence the letters "TE" of the acronym. The "A" of the acronym refers to the fact that the pressure in the laser is on the order of atmospheric pressure (in the preferred embodiment, for instance the pressure is three times atmospheric pressure). For details of TEA $CO_2$ lasers see, for instance, Gibson, Javan, and Boyer "Sealed Multi-Atmospheric $CO_2$ TEA Laster Seed Gas Compatible System Using Unheated Oxide Catalyst," Applied Physics Letters, Volume 32, page 726, 1978.

FIGS. 1b and 1c show the high repetition rate, high pressure TEA plasma chamber 54. Referring to FIG. 1b, spark lines 125 provide a source of UV radiation for preionizing the gas between main discharge electrodes 123. A high voltage, fast rise-time high current pulse is supplied by the high voltage pulse electronic system 91 (FIG. 1) to the main discharge electrodes 123 via cables 135 to produce a dense plasma in the $CO_2$, He, $N_2$ laser gas mixture which circulates around the plasma chamber and is driven by fans 133. Waste heat generated in the gas is removed from the gas by thermal conduction to the outer walls of the plasma chamber, which are in turn cooled by the water jacket 127. Acoustic damping is provided to reduce acoustic ringing in the laser gas, produced by shock waves resulting from the discharge of energy through the main electrodes. Cooling fins 129 are provided within the plasma chamber 54. Referring to FIG. 1d, a stable resonator structure for defining resonator 50 is shown for use in conjunction with the high repetition rate TEA plasma chamber 54. The separations of the mirrors 90, 92, 93 for this resonator structure are maintained at fixed stable distances by means of invar spacer rods 37. Mirrors are mounted and held in tunable mirror mounts 149, 151, and 153. Brewster angle windows 139 which seal the TEA plasma chamber 54 are mounted to intermediate stiffener plates which in turn are secured to the invar rods. The stiffener plates are isolated acoustically and mechanically from the plasma chamber by shock mounts 155 and massive table 154 in the following way. The plasma chamber is supported on shock mounts resting on the heavy table 157, while the resonator structure is supported by separate shock mounts also standing on the massive table 157, so that mechanical shocks generated in the plasma chamber are isolated from the resonator structure. Also mounted to intermediate plate 159 is a low pressure laser tube 152 filled with a HeNe mixture for monitoring and stabilizing the resonator length in a manner to be described below.

Prior Art Sensing and Stabilizing of a Resonator Frequency

The tracking, stabilizing and control system is most easily explained by first referring to a known means for sensing resonator frequency of an optical cavity by using an external laser oscillator as a reference, shown in FIG. 2. The cavity to be sensed 7, defined by partially transmissive mirrors 8, is illuminated by light from external laser 1. The cavity 7 is modulated (dithered) in frequency by means of a PZT element 2 which is driven by an audio (dither) oscillator 5. A programmed DC power supply 6 also applies a DC offset voltage to the PZT element 2. Radiation from the cavity is detected by a radiation-sensitive detector 3. The electrical output of this detector is applied to a phase sensitive detector 4. The phase sensitive detector 4 is referenced in phase to PZT element 2 by receiving an input from the audio oscillator 5. The phase of the cavity signal is compared to the reference signal (dither frequency) by the phase sensitive detector to produce an error voltage. This error voltage drives the programmed DC power supply in such a manner as to minimize the error voltage. When the error voltage is minimized, the peak of the resonance of cavity 7 is tuned to the frequency of the input beam from laser 1.

To explain in more detail, reference is made to FIG. 2a. Here a curve represents the transmission of the cavity. Three vertical lines on the graph represent three possible stable frequencies of laser 1 which illuminates the cavity. Horizontal, double-ended arrows at the tops of these vertical lines denote that the cavity resonance is being modulated at an audio rate so that the resonant frequency of the cavity is being changed relative to the oscillator frequency of the illuminating laser in a periodic, coherent fashion. The relative motion of these two frequencies gives rise to a transmission of the cavity which varies at the same audio frequency, with a fixed phase relationship between the modulated transmission of the cavity and the phase of the audio modulating signal. This phase relationship is illustrated in FIG. 2a for each case by a phase diagram shown above the laser frequency line. Case 1, in which the center frequency of illuminating laser 1 is the lowest laser frequency shown, has a phase which is opposite to that of case 3 in which the center frequency of the illuminating laser lies at the high side of the peak of the cavity resonance curve. In the intermediate case 2, the frequency of the illuminating light is assumed to lie directly on the peak of the cavity resonance; in this case the phases correspond and there is approximately a 0 output from the phase sensitive detector. The control is based on this phase reversal characteristic. The phase sensitive detector puts out a DC voltage which is proportional to the magnitude of the transmitted signal, and whose sign is dependent upon the relative phase of the audio dither signal and the modulated transmission, i.e., the phase sensitive detector will put out either a positive or negative signal depending upon which side of the peak of cavity resonance the frequency of the laser signal lies. This positive or negative signal then drives the programmed power supply 6 either in a positive or negative sense to respectively increase or decrease the cavity length (by means of change in the DC offset signal applied to the PZT crystal) to bring about condition 2 where the phase sensitive output is zero.

We should note here that phase-sensitive amplifiers generally have incorporated in them a selectable time constant which represents the time, T, over which a variance signal is averaged to give a fixed DC output. The value of T can be selected to smooth the response of the PZT element 2, assuming that there is some residual fluctuation in the cavity response.

The ultimate precision with which the cavity 7 can be tuned to the laser input is related to the width of the cavity transmission curve of FIG. 2a. The reciprocal of the width of that curve is the cavity Q. For a very wide cavity response or low Q, the frequency deviation from resonator line center (i.e., the condition of case 2) can be quite large before an appreciable correction signal in the positive or negative sense is obtained, and control of the resonator length is necessarily not precise. Conversely, if one has a cavity with a very narrow resonance, the Q is high and a very small deviation from cavity line center gives rise to a very large transmitted signal and hence one can control frequency drift to a very high degree of accuracy.

TEA Pulsed Laser With Dither Tracking and Control

Figures 3, 3A:
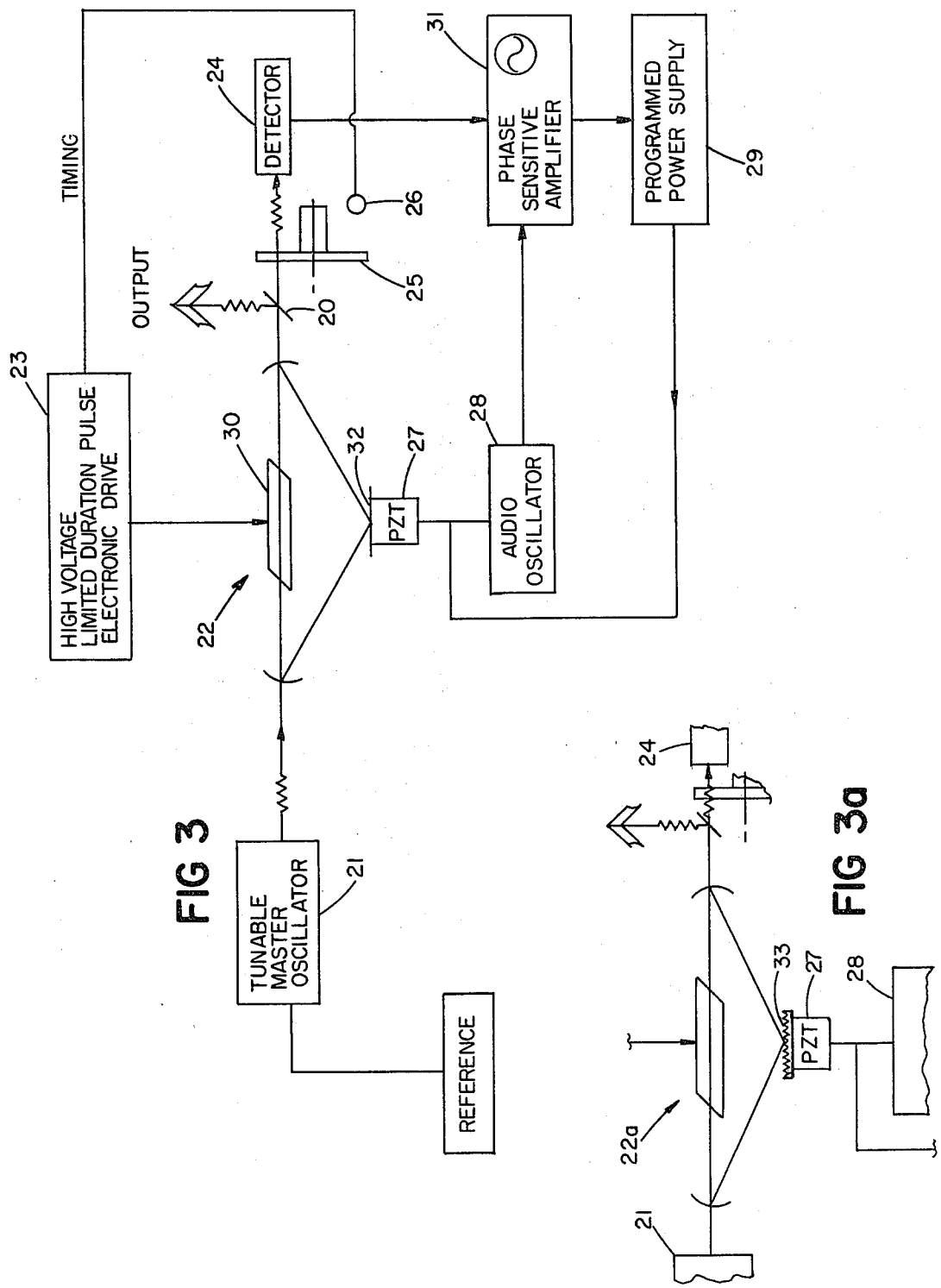
FIGS. 3 and 3a are diagrams of a novel TRA system employing a CW master oscillator for control of the pulsed TEA cavity.

FIG. 3 shows a system for causing an injected TEA laser cavity to track the frequency of a stable, external tunable CW master oscillator laser despite the fact that high peak power pulses are periodically produced by the TEA laser 22. The master oscillator 21 illuminates ring resonator 22 which contains the pulsed TEA laser medium 30. The frequency of the ring resonator can be tuned by means of a PZT element 27 which mounts one of the mirrors 32 of the resonator 22; this PZT is driven (dithered) by audio-oscillator 28 and also by a programmed DC power supply 29. Beam splitter 20 is disposed in the output beam of the ring resonator in order to split off the major portion of the output power for the useful application while a small portion of the output of the TEA laser is directed into detector 24 which drives phase-sensitive amplifier 31. The phase of the phase sensitive amplifier is locked to the audio-oscillator 28 which drives the PZT 27 to produce dither in the cavity frequency of cavity 22.

A chopper 25 is positioned between the beam splitter 20 and detector 24 and a photo diode 26 is positioned to detect the position of the chopper to gate out the high power TEA laser pulse. For this purpose the photo diode is positioned along the chopper wheel to sense when the chopper blocks the path from the beam splitter 20. When this position is sensed, the detector generates a signal which is applied to the high voltage pulsing electronics 23 which triggers discharge to cause the TEA laser to emit its pulse. In this way at the time of the TEA laser pulse, the chopper blocks the high power radiation from reaching the detector.

At the time of pulsing of the TEA laser, the injected signal from the external master oscillator 21 selects the mode at which the TEA laser oscillates over the pulse duration.

In the interval between TEA pulses, the CW master oscillator continues to illuminate the ring resonator. During this time the chopper 25 does not block the path from beam splitter to detector. Accordingly, during this interval the resonator is dithered and the frequency of the master oscillator is tracked so that the peak of transmission of cavity 22 is adjusted to the frequency of the master oscillator.

It will be appreciated that the tracking and control system, besides tuning the resonator 22 to the master oscillator 21, also enables the master oscillator 21 itself to be tuned. As it is tuned the dither system, between TEA pulses, will cause the TEA resonator to follow.

The FIG. 3 system of tracking cavity resonance for an injected TEA laser has its main applicability in certain cases. One case is where the Q of the laser resonator is very high, i.e., because there is a very small output coupling percentage, most of the laser energy being kept within the cavity. Such a system finds use in a laboratory environment where one is not interested in having very high power output. Another case is where one is trying to cause a very low gain line to oscillate, in which case a high Q oscillator must be used to obtain any oscillation at all.

(As is known, the Q of the resonator is inversely proportional to the loss of the resonator. There are certain losses that may not be avoided, such as imperfect windows in the TEA laser and imperfect reflection of the high reflectivity mirrors. But a major loss over which there is control is the loss of radiation from the cavity due to the output coupling of useful energy. If it is possible in the application at hand to keep this output small, then by using a very high reflectivity output coupling, a relatively high Q resonator will result with relatively tight frequency control.)

It is to be noted that the resonator of FIG. 3 will track the master oscillator laser 21 regardless of the Q of the resonator 22. However, if the Q becomes too low and the tracking becomes too loosely controlled, the frequency separation between the master oscillator 21 and the resonator 22 can be so great that injection locking does not occur. In that case the desired mode selection by the injected signal is no longer obtained.

When seeking to injection lock the TEA laser on very weak resonant lines, overcoming the competition of strong lines becomes a very difficult task and requires increased injected power, but it is precisely at these same weak lines where the increased injected power is not ordinarily available from the master oscillator. According to FIG. 3a, a grating overcomes this by introducing high loss to the high gain lines which are competing with the low gain desired line. Referring to the figure, the ring resonator 22 of FIG. 3 is modified by substituting, in resonator 22a of FIG. 3a, a grating 33 for mirror 32 of FIG. 3. The grating 33 discriminates against unwanted lines of oscillation causing this cavity to be resonant at only one selected wavelength in either the 9 or 10 micron band. The grating angle is adjustable enabling selection of different wavelengths.

Tracking TEA Ring Resonator Against Master Oscillator by Transfer Frequency Comparator Where higher frequency stability and versatile frequency tracking is needed (for simultaneous control of master oscillator frequency and pulsed power oscillator resonator mode), the embodiment of FIG. 1 is highly preferred. Simultaneous frequency control (for M.O. and power oscillator mode) makes it possible to introduce automatic programming. It employs a short wavelength laser (within a factor of ten to the TEA laser) to probe the resonant frequency of the longer wavelength TEA laser, i.e., a 3.39 micron laser is employed to monitor the frequency shifts of a 10 micron TEA resonator. Among the advantages, (a) the 3.39 μm originates from a transition but does not interact with the 10 μm radiation. Because of this, even though intense pulses are detected at 10 μm, the 3.39 μm can oscillate in a CW fashion, continually probing resonator mode shifts caused by refractive index always due to periodic intense excitation of the $CO_2$ plasma medium, (b) it is possible to use a simple filter (such as a quartz flat) in front of the 3.39 μm detector, to eliminate entirely the 10 μm radiation from radiation 3.39 detector. Another advantage is that the 3.39 micron radiation, being of shorter wavelength, is capable of resolving smaller distance changes (and corresponding smaller frequency shifts) than is possible when using 10 micron radiation as the probe for the 10 micron TEA laser. Another advantage is that in the dual purpose cavity of the ring resonator, which resonates both at 10 microns and 3 microns, it becomes possible to optimize the Q at 3.39 microns to give a narrow response and hence tight frequency control without sacrificing a larger output coupling (with lower Q) at the 10 micron wavelength. Thus, a highly efficient extraction of the radiation being generated at 10 microns may be obtained.

The system of FIG. 1 is divided into two functional parts, I and II. Part I consists of ring laser 50 containing a 10 micron $CO_2$ TEA laser medium 54 and an internal helium neon laser, 52. A very stable 3.39 reference laser 44 is common to both parts I and II. The function of the components of part I is to stabilize the frequency of the TEA laser resonator.

Part II of the system of FIG. 1 contains the transfer Fabry-Perot ring resonator 74, an empty optical cavity which hence may have a very high Q. Part II also has a second 3.39 micron laser 68 which is narrowly tunable, and is referenced to the fixed frequency 3.39 micron laser 44 by means of an offset locking device 66. The function of part II is to control the frequency of the master oscillator 58 in such a way that it is stable, being referenced to the 3.39 reference laser 44, and to track the frequency changes in the TEA laser resonator 50, 54.

In effect this system, by the novel means shown, reduces the frequency control of the TEA laser resonator and the external master oscillator resonator to the control of two radio frequency generators, which cause the frequencies of the optical components to track one another in a stable ,anner.

TEA Laser Frequency Stabilization Components, Part I

Ring resonator 50 is designed to be resonant at both 10 and 3.39 microns, with very high Q at 3.39 microns. This is achieved by appropriate reflectivities of the dielectric layers that are evporated onto the mirror substrates. Output mirror 90 has a very high reflectivity at 3.39 microns and rather high output coupling of 10 microns so that 10 micron radiation can be efficiently out coupled. The other two mirrors in that cavity are coated for high reflectivity at both 3.39 microns and 10 microns, except that mirror 92 has sufficiently high transmission at 10 microns in order to couple injection locking power into the cavity. In this embodiment typical transmission values are as follows: for mirror 90, 10 micron reflectivity of 80 percent and 3.39 micron reflectivity of 95 percent; mirror 92, 10 micron reflectivity of 90 to 95 percent and 3.39 micron reflectivity as high as possible, e.g., 99 percent; the third remaining mirror, 93, has the highest possible reflectivity at both wavelengths.

Contained in ring resonator 50 is a helium neon plasma tube 52 constructed for CW operation. It produces radiation of 3.39 micron, denoted $\nu_h$. The techniques of making a sealed helium neon laser are well known. However, laser tube 52 is distinct in that it has a large diameter bore (8 to 10 mm, while a typical helium neon tube would have a bore diameter of 1 to 2 mm). This large bore enables minimization of diffraction losses of the pulses at 10 microns due to aperturing effects by the helium neon tube. The windows used in this helium neon tube 52 are transparent both at 10 microns and 3.39 microns (as are the windows of the TEA laser plasma chamber 54).

Helium neon laser 52 is operated CW by application of a DC high voltage on the order of several thousands volts, with a current of several milliamperes.

The TEA laser 54 is pulsed by power source 91 at high voltage and high current and also ultimately at a high repetition rate. As mentioned above, this TEA laser plasma chamber may employ a seeded $CO_2$ laser mixture at approximately 3 atmospheres pressure. This mixture is preionized by means of an ultraviolet pulse of light while the main ionization in the plasma chamber is produced by application of a fast rise time high voltage high current pulse. Details of such action are given in U.S. Pat. No. 3,934,212—1/29/76. The output from this ring resonator passes through mirror 90, to beam splitter 96 which directs the 10 micron radiation pulse to the point of use. The small amount of radiation which passes through beam splitter 96 is passed through a filter 48 which allows the 3.39 micron radiation to pass while filtering out the 10 micron high intensity pulse. Filter 48 is tipped at a small angle to the optical axis, e.g., 10°, to eliminate feedback by reflection from the filter surface back into the ring resonator.

From filter 48 the 3.39 micron radiation passes through beam splitter 46 and into a non-linear RF mixer element 42, which also is irradiated by RF generator 40. Mixer element 42 is a photodetector, e.g., liquid helium cooled copper doped germanium, which is sensitive to 3.39 micron radiation and also has a frequency response in the order of 100 megacycles.

The RF generator 40 is a stable voltage controlled oscillator stabilized by standard RF techniques. Also introduced into mixer 42 is radiation from a very stable 3.39 reference laser 44 (lamp-dip stabilized). The beat note developed is $\nu_b = \nu_{RF} + \nu_r - \nu_h$. The output of mixer 42 passes first through limiter 43 to limit the amplitude of the beat note to avoid overload of the following circuitry. From the limiter the signal enters a broad band amplifier 45 to provide the desired signal strength. The amplified signal is applied to a discriminator 47 which is centered at a frequency $\nu_d°$. The function of this discriminator is to provide a voltage output which is proportional to the deviation of the beat note frequency $\nu_b$ from the discriminator center frequency $\nu_d°$. Thus, if either the RF frequency $\nu_{RF}$, or the frequency $\nu_h$ of the helium neon laser 50, 52 were to vary, a voltage output would be obtained from the discriminator 47 which is proportional to that frequency difference and which has a sign dependent on whether the beat frequency is above or below the discriminator center frequency. The output of discrimintor 47 passes through gate 62 which is controlled by the timing electronics 49 to allow the signal to reach the electronics downstream of the gate only at times long after the TEA laser has fired and long after frequency chirping and high frequency and short term frequency deviations of the ring resonator have died out. High voltage pulsing electronics 91 drives both the TEA laser 54 and provides a signal for the gate 62 for this purpose. The signal from gate 62 is integrated by integrator 64 over some short time period (but still over many, e.g., 10 pulses of the TEA laser which may operate, e.g., at 300 Hz).

The output of integrator 64 goes to a programmed voltage supply 72, nd this programmed supply adjusts the cavity length of the ring resonator 50. Effectively, the stabilization of the resonant frequency of the TEA ring laser is based upon the stability of reference laser 44 while tuning of the ring laser is provided by adjustment of the RF oscillator 40, making use of the same loop.

Operation of TEA Stabilizing Loop

To understand the function of the loop to stabilize the frequency of the TEA laser ring resonator 50, assume that there is a frequency drift in the resonator frequency. This drift will appear as a shift in the frequency $\nu_h$ which causes the beat frequency $\nu_b$ to shift by that amount. The discriminator 47 will consequently generate an error voltage proportional to that frequency shift. That voltage, suitably integrated for smoothing over a time somewhat shorter than the interpulse time, reaches the programmed voltage supply 72 which provides a correction voltage to the PZT control element 56 to restore the desired cavity resonance $\nu_c$. Before the discriminator signal reaches the programmed voltage supply, it has been gated to ensure that the beat note is examined only at the approxiate time after the TEA pulse to avoid rapid transiant that would be caused by the pulsing action of the TEA laser.

Besides the stabilizing effect of this system (by linking the cavity to the highly stabilized reference laser 44), the presence of the adjustable radio frequency, $\nu_{RF}$ in the beat note provides the ability to apply an offset on $\nu_b$ which is independent of any frequency drift of the resonator 50. Thus, the cavity frequency $\nu_c$ may be adjustably offset for tuning purposes. To summarize, the effect of the three components of the beat note, $\nu_r$ is the HeNe reference and is stable, $\nu_h$ from the cavity enters into the beat note in order to correct long term cavity drift, and $\nu_{RF}$ is injected into this beat note in order to introduce long term or permanent frequency shifts.

$\nu_{RF}$ also has an important function in linking the TEA resonator 50 with the tunable master oscillator 58 that provides the injection radiation to the TEA laser. This will be described in detail after explanation of the Transfer Frequency Comparator which controls the master oscillator.

Transfer Frequency Comparator, Part II

Part II of the system employs a second Fabry-Perot ring resonator 74 which has a PZT length control. The mirrors of this resonator are coated to be highly reflective, to provide a high Q at both 10 microns and 3.39 microns. Resonator 74 is an empty resonator (does not contain an amplifying tube), hence can have very high Q at both wavelengths.

This empty resonator 74 is irradiated by two optical wavelengths. Radiation $\nu_s$ is provided by a narrowly tunable 3.39 micron laser 68. The second radiation, $\nu_m$, originates from master oscillator 58 which is a CW tunable 10 micron laser. The two beams are applied respectively through mirrors 79 and 75, in opposite directions so that the beams are counter-rotating in the resonator. Mirrors 79 and 75 are dielectrically coated to have approximately 95 percent reflectivity at the frequency being injected (3.39 microns and 10 microns; respectively), and a reflectivity as high as practically possible at the other wavelength; mirror 77 has 95 percent reflectivity at both frequencies to provide sufficient output from resonator 74 to provide a detectable signal for detector 80 at 3.39 micron and detector 76 at 10 microns.

Because the 10 micron beam and the 3.39 micron beam are counter-rotating in the ring resonator, they are extracted from the resonator in highly divergent paths, angle $\phi$, from mirror 77, permitting the respective detectors to operate without filters and allowing separate, accurate monitoring of the circulating power in the 10 and 3.39 micron beams.

The output of the 3.39 micron detector 80 drives the phase sensitive amplifier 82 which is referenced to audio oscillator 84. The audio oscillator 84 also drives programmed PZT supply 78 to provide a dither signal on mirror 77 of the resonator 74. The output of the phase sensitive amplifier 82 also drives the same PZT programmed supply but at a DC voltage. The operation of the components described so far is therefor to lock the frequency of the Fabry-Perot ring resonator 74 to the frequency of the narrowly tunable 3.39 micron laser 68. That is, the chain of 3.39 detector 80, the phase sensitive amplifier 82, and the audio oscillator programmed PZT supply 78 operate to maintain the output of phase sensitive amplifier 82 at a minimum so that the 3.39 micron resonance of resonator 74 tracks the 3.39 micron laser 68. Simultaneously (for control of the 10 micron master oscillator 58) the resonator 74 transmits 10 micron radiation $\nu_m$, which is detected by detector 76. This feeds another phase sensitive amplifier 86, which is referenced to the same audio oscillator 84. The sign of the output of phase sensitive amplifier 86 therefore depends upon whether $\nu_m$ is above or below the resonant frequency (for the 10 micron wavelength) of the resonator 74. The phase sensitive amplifier then drives a programmed PZT tuning control 88 which drives the PZT element 59 in the master oscillator 58 to correct the master oscillator frequency so that $\nu_m$ $_{1\ is\ maintained\ on\ the\ peak\ of\ the\ cavity\ resonance\ of\ reference\ resonator\ 74.}$ Thus, the function of part II, the Transfer Frequency Comparator, is to control the frequency of the master oscillator 58 so that it has a fixed relationship to the frequency of the narrowly tunable 3.39 micron laser 68.

Relationship Between Part I, The TEA Laser Frequency Stabilizing Loop and Part II, The Transfer Frequency Comparator Loop Parts I and II are related through the highly stabilized laser 44, $\nu_r$ (or $\nu_{reference}$), in the following manner. A portion of $\nu_r$ passes through beam splitter 46 and is incident upon offset lock device 66. The offset lock device (for details, see FIG. 5, described later) functions to sense both $\nu_r$ and the frequency $\nu_s$ of the narrowly tunable laser 68 of the transfer comparator and to hold the frequency difference between those two lasers at a stable but tunable microwave frequency denoted by $\nu_{os}$ (or $\nu_{offset}$). Thus, the offset lock device 66 provides that the narrowly tunable laser 68 will operate at frequency $\nu_r + \nu_{os}$. As the master oscillator 58 is dependent upon the frequency of the narrowly tunable laser 68, hence it becomes dependent upon microwave frequency $\nu_{os}$. Thus, two RF oscillators, oscillator 40 and RF oscillator 95 for offset lock device 66 determine the operation of the system. By tuning these two RF oscillators in the appropriate manner, the frequency of the master oscillator and the peak of the resonant frequency of the ring resonator 50 containing the TEA laser 54 can be maintained equal at all times. Then, by use of the programmed tuning control unit 70 (described later in reference to FIG. 6), the frequency of the locked-together master oscillator and the TEA laser resonator can be tuned across the desired region of the spectrum by controlled variation of the RF oscillators.

Summary of the Operation of The System of FIG. 1

Figure 4:
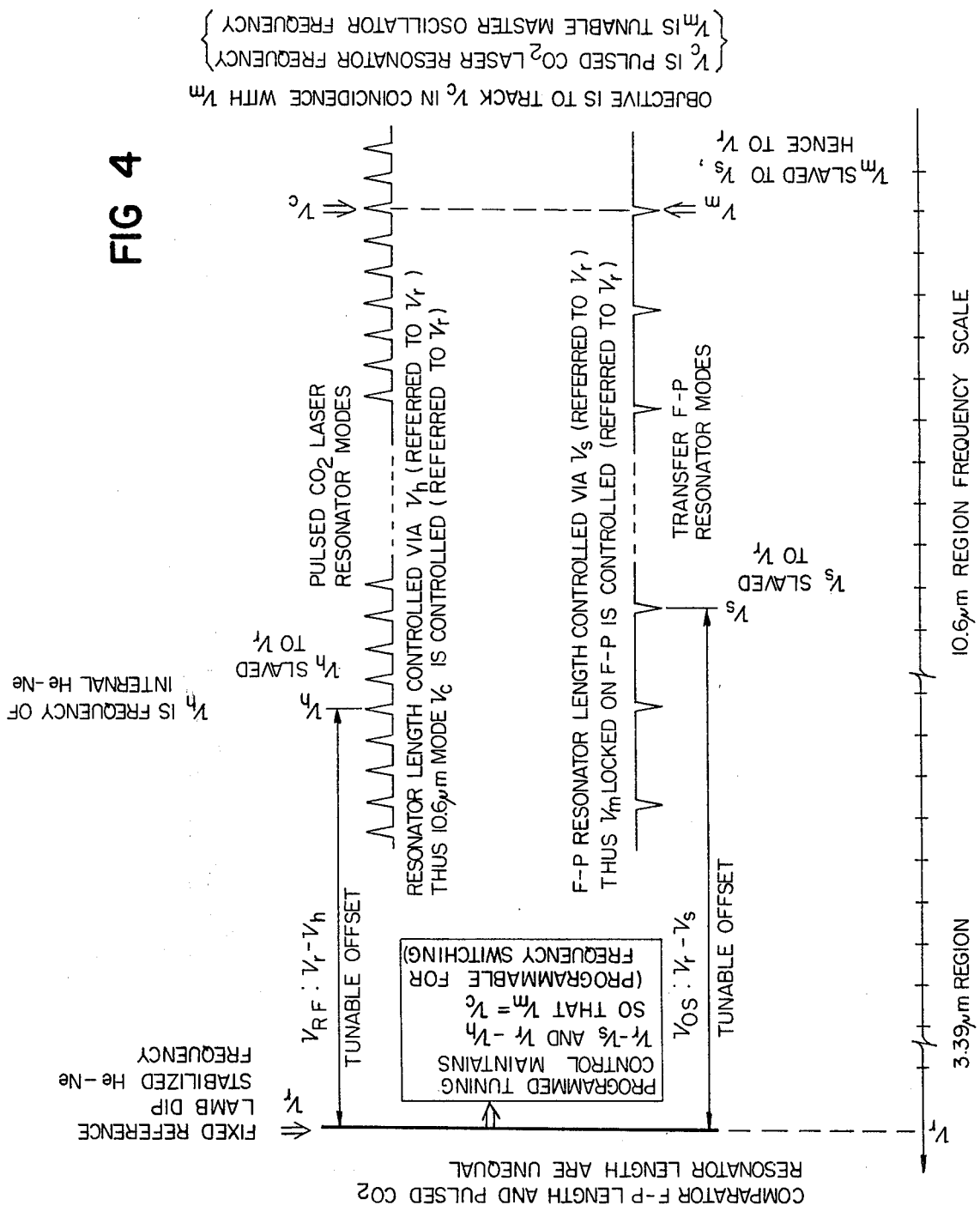
FIG. 4 is a diagram illustrating the relationship between the microwave references and the optical resonances of the system of FIG. 1.

The frequency of the pulsed TEA laser 54 has been stabilized against long term drifts by the feedback loop, part I, which consists of the output of internal helium neon laser 54, $\nu_h$, beating against the output of reference laser 44, $\nu_r$, and driving a feedback loop to stabilize that cavity 50. At the same time by introducing an RF oscillation, $\nu_{RF}$, into this beat frequency, it becomes possible to offset the resonant frequency, $\nu_c$, of the TEA laser cavity for tuning purposes. Simultaneously, the frequency of the master oscillator has been stabilized against the same reference $\nu_r$ provided by laser 44. Tunability of the stabilization loop is achieved by the oscillator 95, providing $\nu_{os}$ to the offset locking device 66. The problem of tracking and control has thus been reduced to the tracking of the frequencies of two microwave oscillators in the programmed tuning control device 70. Specifically, the frequency of the TEA laser resonator, $\nu_c$, is controlled by oscilltaor 40, $\nu_{RF}$, by establishing $\nu_c$ as a multiple of $\nu_{RF}$, by a constant which relates microwave frequency, $\nu_{RF}$ to the optical frequency $\nu_C$. At the same time the frequency, $\nu_m$, of the master oscillator 58 is controlled by $\nu_{os}$ where once again the frequency $\nu_m$ is established as a multiple of microwave signal $\nu_{os}$, by a constant which relates microwave $\nu_{os}$ to the optical frequency $\nu_m$. FIG. 4 shows the relationship between $\nu_{os}$ and $\nu_{RF}$ and the cavity lengths of the TEA laser cavity 50 and of the comparator cavity 74. The relationship between the two RF frequencies is maintained by the programmed tuning control adjustment 70 so that the optical frequencies $\nu_m$ and $\nu_c$ track one another (are equal) over the tuning range.

Offset Lock Device 66

Figure 5:
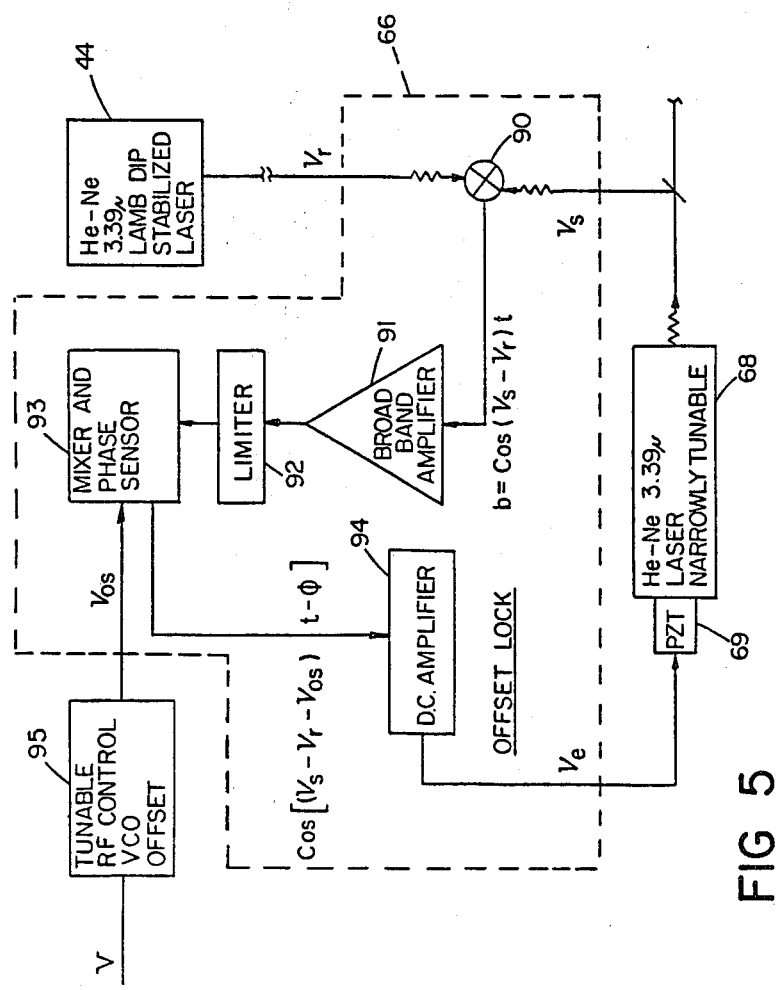
FIG. 5 shows details of a preferred form of the offset lock device.
Figure 5A:
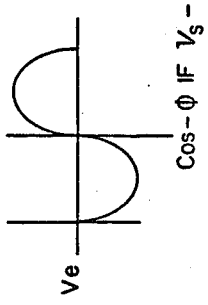
FIG. 5a is a phase diagram related to FIG. 5.

Referring to FIG. 5, offset lock device 66 maintains the frequency $\nu_s$ of narrowly tunable helium neon laser 68 offset from the frequency of stable laser 44, $\nu_r$. Narrowly tunable laser 68 is equpped with a PZT crystal 69 for varying the frequency of its cavity; that PZT driven by dc amplifier 94 of offset lock device 66. To produce this output, offset lock device 66 receives optical input signals $\nu_r$ and $\nu_s$ from lasers 44 and 68, and mixes them in nonlinear mixer 90 to produce a beat note representing their frequency difference, $b = \cos(\nu_s - \nu_r)t$. Beat note b is amplified in a broad band amplifier 90 and its amplitude is limited by a limiter 92 to prevent overload of the downstream circuitry. That beat note is then applied to Mixer and Phase sensor circuit 93. There it is mixed with an RF signal $\nu_{os}$ to produce another beat note whose frequency represents the frequency difference between the optical beat note b and the RF signal $\nu_{os}$. This gives rise to a voltage at the output of mixer and phase sensor 93 which is proportional to $\cos[(\nu_s - \nu_r - \nu_{os})t - \phi]$, $\phi$ being a phase factor. In establishing the circuit, the frequency of $\nu_s$ is manually adjusted so that $\nu_s - \nu_r$ is equal to $\nu_{os}$. In this manner sensor 93 is reduced to $\cos \phi$ which is a constant dc signal. This signal is amplified by the dc amplifier 94 and applied to the PZT crystal 69. Should the frequency loop relationship $\nu_s - \nu_r = \nu_{os}$ drift slowly in time, such drift produces a change in the voltage from phase sensor 93 which is proportional to the cosine of a very small error of frequency minus the phase factor. As seen in FIG. 5a, such cos function, error voltage $V_e$, passes through zero voltage when the desired relationship is satisfied and produces increasingly larger error signals as $\nu_s$ progressively varies further from the desired frequency relationship with sign dependent upon the direction of error. That error voltage $V_e$ is supplied in the appropriate polarity to the PZT crystal 69 to bring the frequency relationship back to that which is desired, $\nu_s - \nu_r = \nu_{os}$. Thereby $\nu_s$ is stabilized against $\nu_r$ with the stability that is essentially as good as the stability of the microwave oscillator 95 $\nu_{os}$. Furthermore, by tuning the frequency $\nu_{os}$ by tuning the offset oscillator 95, the frequency $\nu_s$ of laser 68 is tuned.

The value of the phase factor has to do with the relative phases between $\nu_s$ and $\nu_r$ and $\nu_{os}$, and is arbitrary, as will be appreciated by those technically skilled. Among other things it has to do with the length of the cable leading from $\nu_{os}$ oscillator 95 to mixer and phase sensor 93, and with the length of the optical path between the two lasers 44 and 68 which feed into nonlinear mixer 90; it is essentially arbitrary and can be varied to desired value electronically or by varying e.g. cable length.

Programmed Tuning Control

Figure 6:
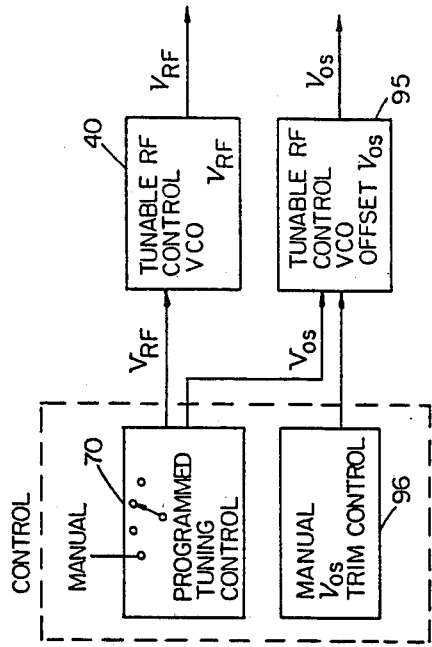
FIG. 6 shows details of a preferred programmed tuning control unit.

Referring to FIG. 6, the overall control of the two frequency stabilized loops depends upon first making $\nu_c$, mode of resonstor 50, equal to $\nu_m$, the master oscillator frequency. After that, by frequency tuning of $\nu_c$ and $\nu_m$ simultaneously, by tuning the oscillators 40 and 95, and 50 controlling $\nu_{rf}$ and $\nu_{os}$ by equal amounts, the system can be tuned.

To make the initial adjustment for coincidence between master oscillator and injected power amplifier cavity, $\nu_{rf}$ is held constant and $\nu_{os}$ is tuned by manual trim control 96 applied to $\nu_{os}$ oscillator 95. After this equality is achieved, the subsequent tuning of the oscillators 40 and 95 is by equal amounts (in fact could be the same oscillator) with appropriate electronic tuning voltage generated by programmed tuning control 70.

Detailed Tuning Procedure

The system of FIG. 1 is turned on and the control loop of each chain is closed. When thus obtaining coincidence of $\nu_c$ and $\nu_m$ further tuning of the two chains is effected simultaneously by varying a variable voltage produced by programmed tuning control 70, this variable voltage being split and fed to the electronic control input of the two voltage control oscillators 70, $\nu_{rf}$, and 95, $\nu_{os}$, so that those oscillators change by identical increments. Those frequency increments are then transmitted down the chains in such a way that the master oscillator and the injection lock cavity stay in coincidence with each other. It is now the function of the programmed control to vary the tuning command signals to the V co's 40 and 95 in order to select the frequencies desired. The system will follow. In order to close the master oscillator loop so that a change in $\nu_s$ produces a change in $\nu_m$, a heterodyne procedure is followed in which $\nu_m$ is beat against a reference at 10 microns. While looking at the frequency difference, $\nu_s$ is manually tuned (as by tuning $\nu_{os}$ trim control 96) until $\nu_m$, changes in concert with $\nu_s$ signifying that the loop is closed. A similar procedure is followed for the other loop by looking at the transmission of the master oscillator through the TEA cavity 50. For this procedure the TEA laser is turned off and the CW signal is employed as a fixed frequency source while the transmission center frequency of the TEA cavity is progressively changed by tuning $\nu_{rf}$. If the transmission of the TEA cavity responds to frequency tuning of $\nu_{rf}$ then one knows that the loop is closed and that changes in the rf frequency are being manifested as changes at 10 microns at the other end of the chain.

Upon thus closing each loop, the two loops are locked together. For this, the manual tuning control for $\nu_s$ is manipulated while once again looking at the transmission of the master oscillator through the TRA cavity (not being pulsed) and adjusting $\nu_s$ such that the maximum amount of transmission of $\nu_m$ through that cavity is obtained. This condition means that $\nu_m$ equals $\nu_c$.

Stabilizing and Tracking Frequency of a Diode Laser

Figure 7:
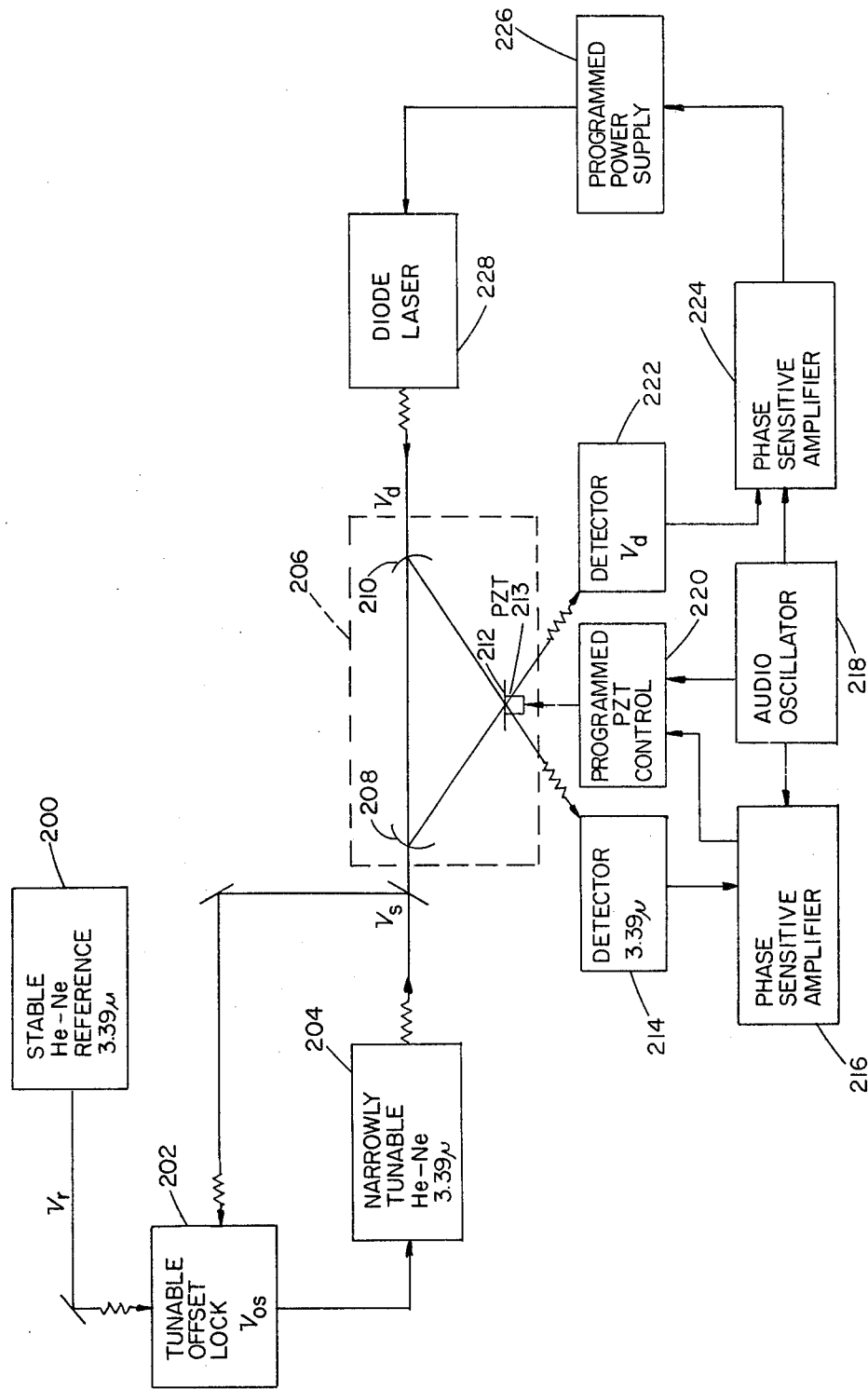
FIG. 7 shows a system for stabilizing and tracking the frequency of a diode laser.

The purpose of the embodiment of FIG. 7 is to stabilize a diode laser 228 relative to a stable reference laser and to tune it by a known offset frequency which is in the microwave region.

In FIG. 7, once again a stable helium neon reference laser 200 operates at 3.39 microns. Once again an offset locking device 202 serves to lock the frequency of a second narrowly tunable 3.39 micron laser 204 to lock its reference at some frequency offset from $\nu_r$ ($\nu_{reference}$) by an amount equal to $\nu_{os}$ ($\nu_{offset}$). The frequency of this offset narrowly tunable laser 204 is denoted by $\mu_s$, the frequency comparators 206 comprises an empty Fabry-Perot ring resonator defined by three mirrors 208, 210, and 212. They have reflectivities at both the frequency $\nu_s$ and the laser diode frequency $\nu_d$ of approximately 95 percent for each mirror. Mirror 212 is controlled by a PZT crystal 213. Once again a detector 214 examines the 3.39 micron radiation transmitted by the comparator 206. That radiation is modulated at an audio frequency provided by audio oscillator 218 driving programmed PZT control 220 which oscillates the mirror 212 and hence dithers the frequency of the comparator 206. This modulated output at 3.39 microns is amplified by a phase sensitive amplifier 316 referenced to the audio oscillator 218 and hence gives a DC output whose sign depends on the relative frequencies of $\nu_s$ and the resonance of comparator cavity 206. This signed output then is used to drive programmed PZT control 220 so that the resonator 206 always has a peak response at the frequency $\nu_s$.

Simultaneously the laser diode frequency is circulating in the resonator in the sense opposite to that of the 3.39 micron radiation. It is detected by detector 22 and is amplified by second phase sensitive amplifier 224 which is referenced once again to oscillator 218. The output of the phase sensitive amplifier once again has a sign which depends upon whether the resonator 206 is at a higher or lower frequency than the laser diode frequency $\nu_d$. This DC voltage drives a programmed supply 226 to provide an error voltage to the diode laser to bring its frequency back into coincidence with the frequency of resonator 206. The net result is that the frequency of a diode laser 228 is controlled by the microwave frequency $\nu_{os}$.

Figure 8:
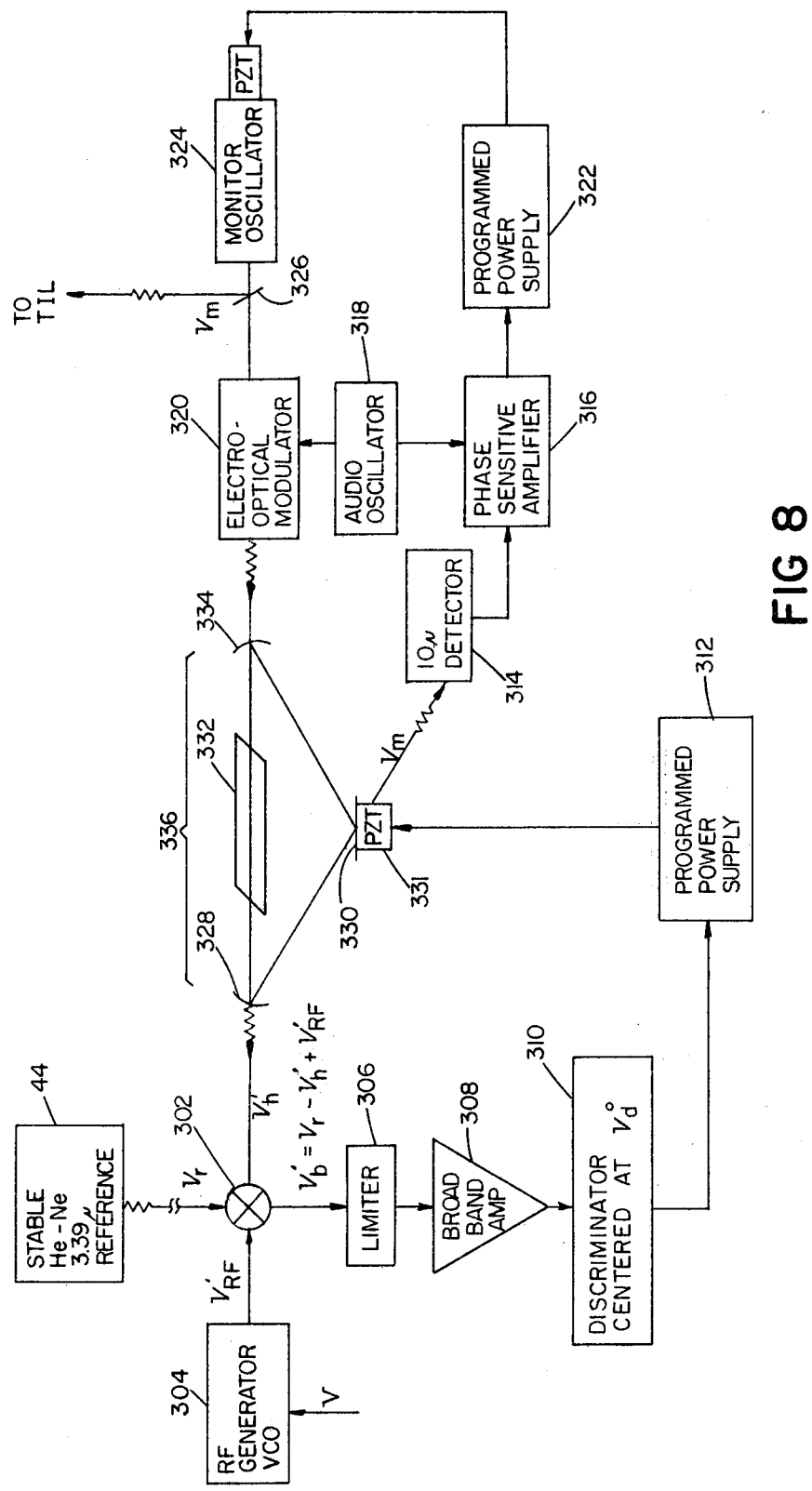
FIG. 8 shows a system in which a narrowly tunable pulsing laser is incorporated in the resonator of a transfer comparator.

Transfer Frequency Comparator Which Combines the Functions of the Narrowly Tunable Helium Neon and the Resonator Structure Itself Referring to FIG. 8, an alternative Part II for FIG. 1, the helium neon plasma tube 332 which has been the narrowly tunable external laser in FIGS. 1 and 7 is now contained within ring resonator structure 336, comprised of 3 mirrors 328, 330 and 334 which are dielectrically coated to be highly reflective, that is 95 percent reflective at both 10 microns and 3.39 microns. The output of stable reference laser 44 (see FIG. 1) having a frequency $\nu_r$ at 3.39 microns is introduced into non-linear mixed 302 where it is combined with radiation at frequency $\nu_h'$ from laser 332 and also combined with radio frequency energy at $\nu_{RF}'$ from RF generator 304 to produce a beat note $\nu_b'$ given by $\nu_b' = \nu_r - \nu_h' + \nu_{RF}'$. This beat note passes to limiter 306, then to broad band amplifier 308 and then to discriminator 310 centered at $\nu_d°$. The output of discriminator 310 is proportional to the deviation from beat note $\nu_b'$ from $\nu^{d°}$ and its sign depends on whether $\nu_d°$ is greater or less than $\nu_b'$. This signed error voltage drives programmed power supply 312 which in turn drives PZT 331 to correct the resonator length such that variations in the resonator length, as manifested by variations of $\nu_h'$, are removed, thereby stabilizing cavity length of resonator 336. At the same time by changing voltage V, hence a varying $\nu_{RF}'$, the resonant frequency of resonator 336 can be offset. The 10 micron radiation from the master oscillator 324 is beam split by beam splitter 326. Most of that radiation is directed to the TEA laser as indicated while a small fraction of the master oscillator radiation of frequency $\nu_m$ is directed into an electro-optic modulator 320. Electro-optic modulator 320 in turn is driven by an audio oscillator 318 which also provides the reference signal for phase sensitive amplifier 316. Ten micron radiation at frequency $\nu_m$ from the master oscillator, which has been frequency-modulated at the audio frequency now circulates through the comparator resonator and emerges from mirror 330 where it is detected by 10 micron detector 314 and fed to the phase sensitive amplifier 316. The output of phase sensitive amplifier 316 now depends on the offset frequency of the master oscillator from the resonator 336. The sign of this DC voltage is once again dependent on the sense of the offset of master oscillator frequency from the resonator frequency, and hence a correction voltage is generated and sent to the programmed power supply 322. The output of the power supply drives the master oscillator PZT to correct its frequency and bring it in to resonance with resonator 336.

In this way it is possible to stabilize the output of the master oscillator with an accuracy approaching that of the stable laser 44 and also possible to tune the master oscillator by means of adjustment of RF oscillator 304.

It should be noted that helium neon laser 332 will always find a resonator mode lying within its gain bandwidth for any reasonable size resonator 336. This is because the helium neon gain profile is very broad and practical cavity spacings will be wider than the width of the gain bandwidth of resonator 336.

Figure 9:
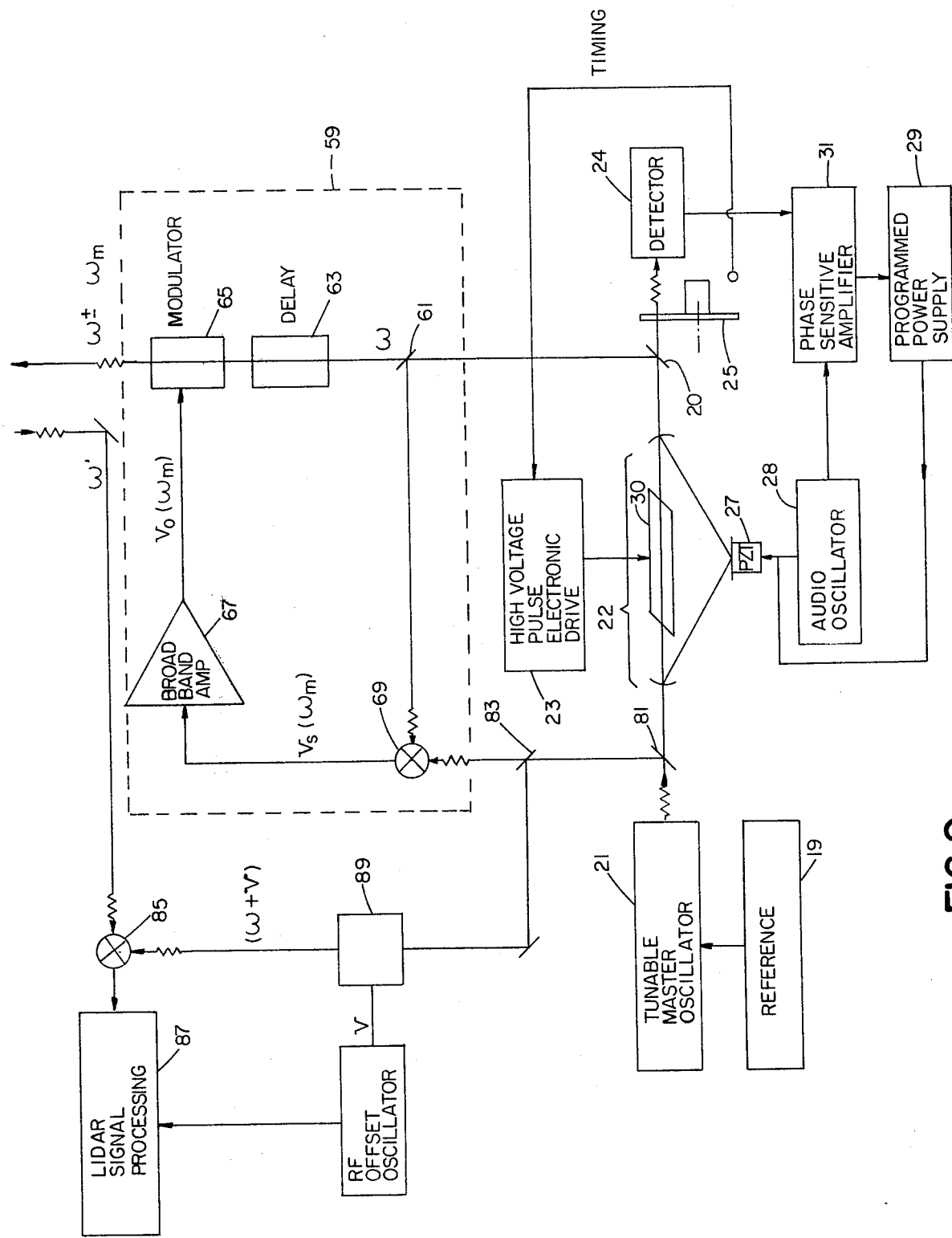
FIG. 9 shows a LIDAR system employing the control system of FIG. 3 and means for removing the chirp frequency.

Referring to FIG. 9, a LIDAR system is shown incorporating the stabilizing system of FIG. 3 and means for removing the frequency chirp from a pulsed transiant injection locked power oscillator output (here a transversely excited TEA) $CO_2$ laser is chosen as before. The TEA power laser 30 is injection locked by tunable CW master oscillator 21 which is stabilized by reference 19. The master oscillator output is injected into ring resonator 22 which contains pulsed TEA laser 30 driven by high voltage electronics 23. The resonant frequency of ring resonator 22 is adjusted by means of programmable power supply 29 and audio oscillator 28 driving PZT 27. Chopper 25 blocks the high peak power pulses from the pulsed TEA laser from reaching detector 31 but allows CW radiation transmitted through cavity 22 originating from master oscillator 21 to reach detector 24 between pulses. At such times radiation from master oscillator 21 traversing cavity 22 is phase detected in amplifier 31, giving a correction voltage to programmed power supply 29 to correct the length of resonator cavity 22 to maintain resonator 22 on resonance with the master oscillator frequency. Beam splitter 20 couples out a major portion of the power of the TEA laser and directs it into the device 59 for removing fast frequency chirps. This device consists of a beam splitter 61 which directs a small portion of the chirped radiation to a mixer 69 while allowing most of the radiation to go on to an optical delay line 63 and then to electro-optic modulator 65. A portion of the master oscillator signal is split off at beam splitter 81 and also directed into nonlinear mixer, 69 to generate a chirp beat frequency at frequency $\omega_m$ with amplitude $V_s$. This signal passes to broad band amplifier 67 where it is amplified to an amplitude of $V_o$ again at chirp frequency $\omega_m$, and the amplified signal is applied to modulator 65. This modulating voltage puts sidebands on the chirped central carrier frequency $\omega$ (the frequency present during the high power pulses) in such a way that one side band has the chirp removed and is employed as the fixed frequency pulsed LIDAR signal (the other side band adds to the effects of the chirp and is disregarded by the following system).

In the LIDAR system, the stabilized frequency is e.g. reflected from a moving target or back scattered from a pollutants. The reflected return signal has a doppler shifted frequency $\omega'$ and is directed into nonlinear mixer 85 upon which a portion of the master oscillator suitably offset by $\nu$ has also been focused by beam splitters 81 and 83 and offset modulator 89. The resultant beat signal is then processed by the downstream LIDAR signal processing apparatus 87 (which also receives the RF offset).

In operation the stabilizing apparatus consisting of the audio oscillator 28 and PZT 27 provides a dithering stabilization system to maintain the center frequency of the mode of the power resonator 22 in near coincidence with the frequency of the master oscillator, thereby effectively mode selecting in the TEA laser to obtain effective injection locking. A close enough coincidence of the TEA resonance with the master oscillator frequency is established such that a single mode of oscillation is selected in the TEA laser. However this single mode laser still has superimposed on it a considerable amount of chirp, i.e. the single mode frequency varies over time, due for instance to refractive index changes within the laser medium itself. It is the purpose of the electro-optic modulator 65 in combination with the nonlinear mixer 69 and broadband amplifier 67 to remove this chirped component from the TEA laser.

The resultant stable sideband is very monochromatic, (single frequency) and hence gives high resolution.

Heterodyne detection is utilized in this LIDAR system. The source of the local oscillator power is once again master oscillator 21. Master oscillator 21 is a CW device and is stable so that even though there is a time delay between the launching of the unchirped signal and its reception upon return at frequency $\omega'$, the master oscillator signal used as the local oscillator (with suitable RF offset) is present for the nonlinear mixer 85 at the right time and at the proper frequency.

Pulsed Master Oscillator

Figure 10:
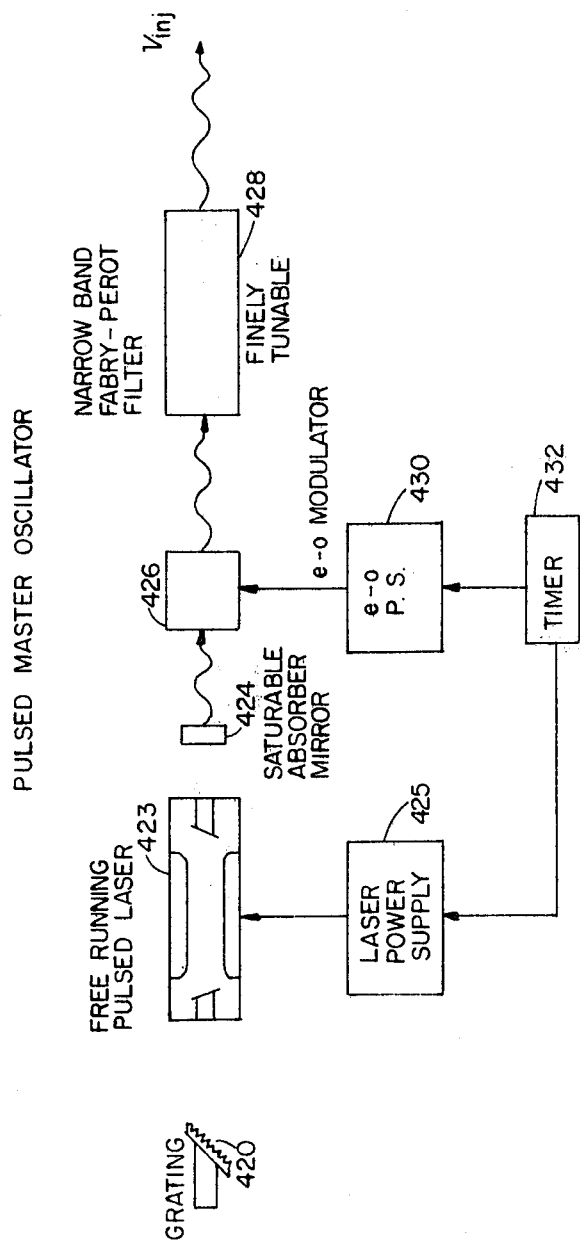
FIG. 10 shows a pulsed master oscillator.

It is possible to use a pulsed laser oscillator as the source of radiation for transient regenerative amplification. Such a pulsed master oscillator is shown in FIG. 10.

In one preferred embodiment, a tunable, high pressure pulsed $CO_2$ laser, 423 is the source of tunable coherent radiation. It may be tuned to the approximate frequency desired by means of diffraction grating 420. Laser mirror 424 is a saturable absorber of gallium doped germanium. Mirror 424 introduced a nonlinear loss into the laser resonator which couples the axial cavity modes thereby producing mode locking. This ensures consistent, repeatable multimode oscillators of the free running pulsed laser, 423. Output of the laser is directed into electro-optic modulator 426 where the spectral width of each oscillating laser mode is broadened by an amount equal to the laser mode spacing. Therefore the radiation emerging from the e-o modulator has a continuous spectrum across the frequency range of oscillation of laser 423. No where in that range does radiation intensity fall to zero. This spectral broadening may be achieved in one of two ways. Timer 432 may provide a ramp voltage to programmed e-o power supply 430 to produce a time varying index of refraction change in electro-optic modulator 426. This results in a frequency sweep of all the oscillating modes of 423. Alternatively, timer 432 may trigger a short voltage pulse from 430. In this case 426 is provided with crossed polarizers in the standard way to function as an electro-optic switch, so that only a short portion of the longer laser pulse is transmitted by 426. If the duration of the transmitted pulse is $\tau$ then the frequency spread imparted to each laser mode traversing 426 is $1/2\pi\tau$. In this way, nanosecond pulses may be generated having a frequency spread on the order of gigacycles. In each case, the timer 432 produces the appropriate delay after triggering of laser power supply 425 before activating P.S. 430 so that radiation from 423 is near its maximum intensity at the position of 426.

Broad band radiation from 426 is directed into narrow-band Fabry-Perot filter 428. The filter may be a ring resonator with length adjustments via PZT crystal for fine frequency tuning. The output of 428 is a narrow band pulse of radiation, the frequency of which, $\nu_{inj}$, is the resonant frequency of 428, the spectral width of the radiation is that of 428 and is desired to be quite narrow and may be made so by designing 428 for high Q and, the stability of which is determined solely by the stability of 428, independent of frequency instability in 423. In this way several watts of peak power may be obtained at frequency $\nu_{inj}$.

It should be noted that the free spectral range of 428 must be made larger than the frequency range of oscillation of laser 423 so that only a single mode of 428 is excited at any time, thereby avoiding the production of more than a single frequency of output from 428. The requirements of high Q and large free spectral range for 428 are conflicting, a way to achieve both simultaneously will be described below.

For certain applications, very narrow band radiation at frequency $\nu_{inj}$ may not be required in which case certain simplifications are possible. The e-o modulator 426 and power supply 430 may be deleted and the Q of 428 may be decreased to the point where it will always transmit at least one oscillating mode of 423 (occasionally two modes may pass through depending on the relative tuning of the resonators 423 and 428.) It is still desired to keep the free spectral range of 428 greater than the frequency range of oscillation of laser 423. It should be noted that by accepting a broader spectral width for $\nu_{inj}$ in this way, it is possible to obtain peak intensities for the injected radiation on the order of 100 watts or larger. Hence, the requirement for coincidence of $\nu_{inj}$ with the resonant frequency of the regenerative amplifier modes is relaxed.

Figure 11:
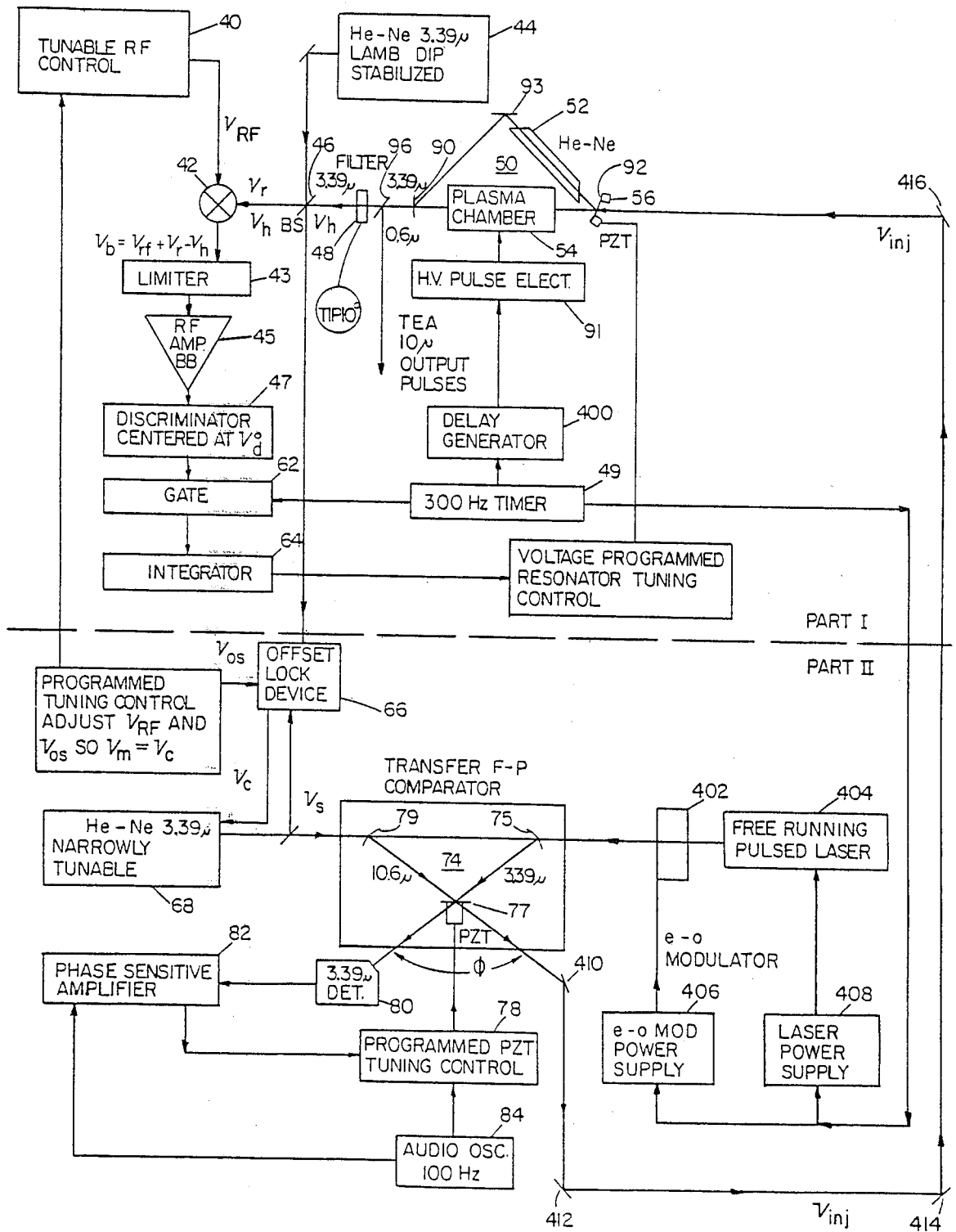
FIG. 11 shows a transit regenerative amplifier system employing a novel pulsed master oscillator.

Frequency Tracking and Control of a Transient Regenerative Amplifier Using a Pulsed Master Oscillator FIG. 11 shows how a pulsed master oscillator may be incorporated into a transient regenerative amplifier. Multimode, modelocked, radiation from free running pulsed laser 404 is frequency broadened by e-o modulator 402. Laser 404 is energized by power supply 408 on command of timer 49. Modulator 402 is energized by supply 406 on command of 49. Regenerative amplifier 50 is energized by H.V. pulse electronics 91 in response to timer 49 after a time delay produced by delay generator 400 to allow injected radiation at $\nu_{inj}$ time to reach 50. Broad-band radiation from 402 is directed into transfer F-P comparator 74 which now serves as a tunable narrow band filter. The length of resonator 74 is stabilized relative to the frequency of narrowly tunable laser 68 via the feedback loop consisting of 3.39$\mu$ detector 80, phase sensitive amplifier 82, programmed PZT control 78, audio oscillator 84, and PZT controlled mirror 77 as previously described. Hence the frequency $\nu_{inj}$ of the pulsed radiation emerging from the F-P filter and incident on mirrors 410, 412, 414, and 416, and directed into the regenerative amplifier resonator, is determined by the frequency of laser 68 and hence is responsive to the tuning of the frequency $\nu_{os}$. The frequency of the pulsed master oscillator is therefore controlled in the same way as in the case of a C.W. master oscillator as previously described. The tuning of the system and tracking of pulsed master and regenerative amplifier follows identically as previously described.

Figure 12:
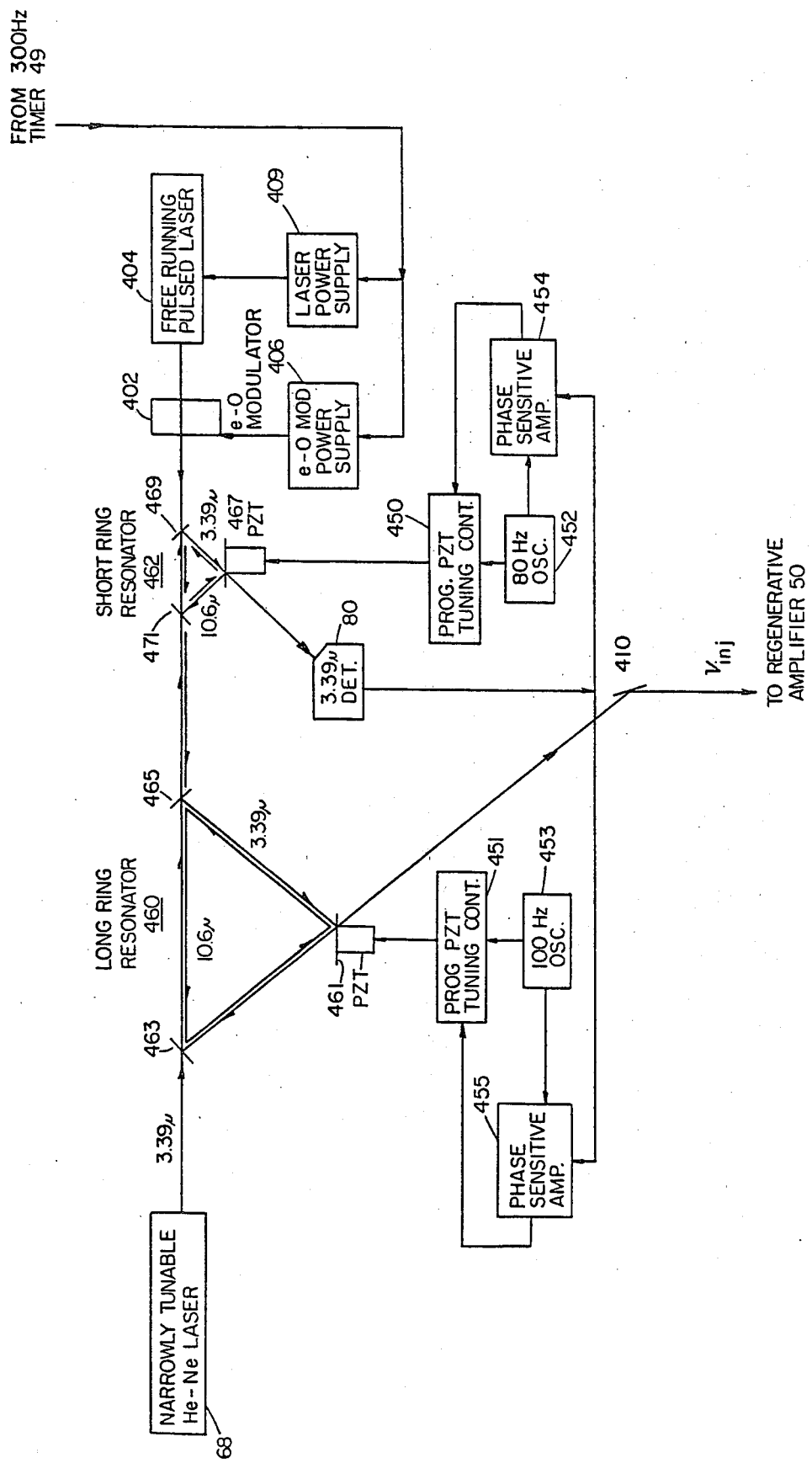
FIG. 12 shows a pulsed master oscillator employing a coupled ring resonator filter.

Method for Simultaneously Obtaining High Q and Large Free Spectral Range in a Tunable Ring Resonator Filter FIG. 12 illustrates the use of two coupled ring resonators for obtaining spectrally narrow pulses of radiation from the free running pulsed laser. Resonator 460 has a large perimeter and hence high Q and small free spectral range. Resonator 462 has a small perimeter and hence low Q and large free spectral range. The lengths of both resonators are stabilized relative to the narrowly tunable laser 68. The mirrors 463, 465, 461 and 471, 469, 467 are coated to be partially transmissive at 3.39$\mu$ and 10.6$\mu$ as previously describe in reference to transfer F-P comparator 74 of FIG. 1. Radiation from 68 is incident on ring resonator 460 which is modulated at 100 Hz by oscillator 453 and programmed tuning control 451. Some of the 3.39$\mu$ radiation, amplitude modulated at 100 Hz emerges from mirror 465 and is coupled into resonator 462 via mirror 471. Resonator 462 is modulated at 80 Hz by oscillator 452 and programmed tuning control 450. Some of the 3.39$\mu$ radiation, now amplitude modulated at both 100 Hz and 80 Hz is coupled out of mirror 467 and changed into an electrical signal by 3.39$\mu$ detector 80. This electrical signal is sent to both phase sensitive amplifier 455 where the 100 Hz component is extracted and to phase sensitive amplifier 454 where the 80 Hz component is extracted. The feedback loop for each resonator is closed in the usual way by having the output of each phase sensitive amplifier drive its respective PZT tuning control. Now the length of resonators 460 and 462 are stabilized relative to laser 68 and the resonant frequency of each way be varied by tuning 68. The 10.6$\mu$ resonances of 460 are relatively narrow and closely spaced while those of 462 are relatively broad and spaced far apart in frequency. Transmission of the coupled resonators at 10.6$\mu$ will be possible only where resonant frequencies of both resonators coincide. Therefore the free spectral range of the coupled resonators is as least as great as that of the shortest cavity. The width of the coupled resonance is obtained by multiplying the broad and the narrow response and is essentially that of the long resonator.

Broad band radiation from laser 404 and e-o modulator 402 is incident on the coupled resonators at mirror 469 and narrow band pulsed 10.6$\mu$ radiation is extracted from mirror 461 and directed into the regenerative amplifier cavity. Timing and tracking is effected as described previously.

A Method for Stabilizing Two Master Oscillator Frequencies on Two TRA Cavity Modes to Obtain Transient Regenerative Amplification at Both Frequencies Simultaneously.

Figure 13:
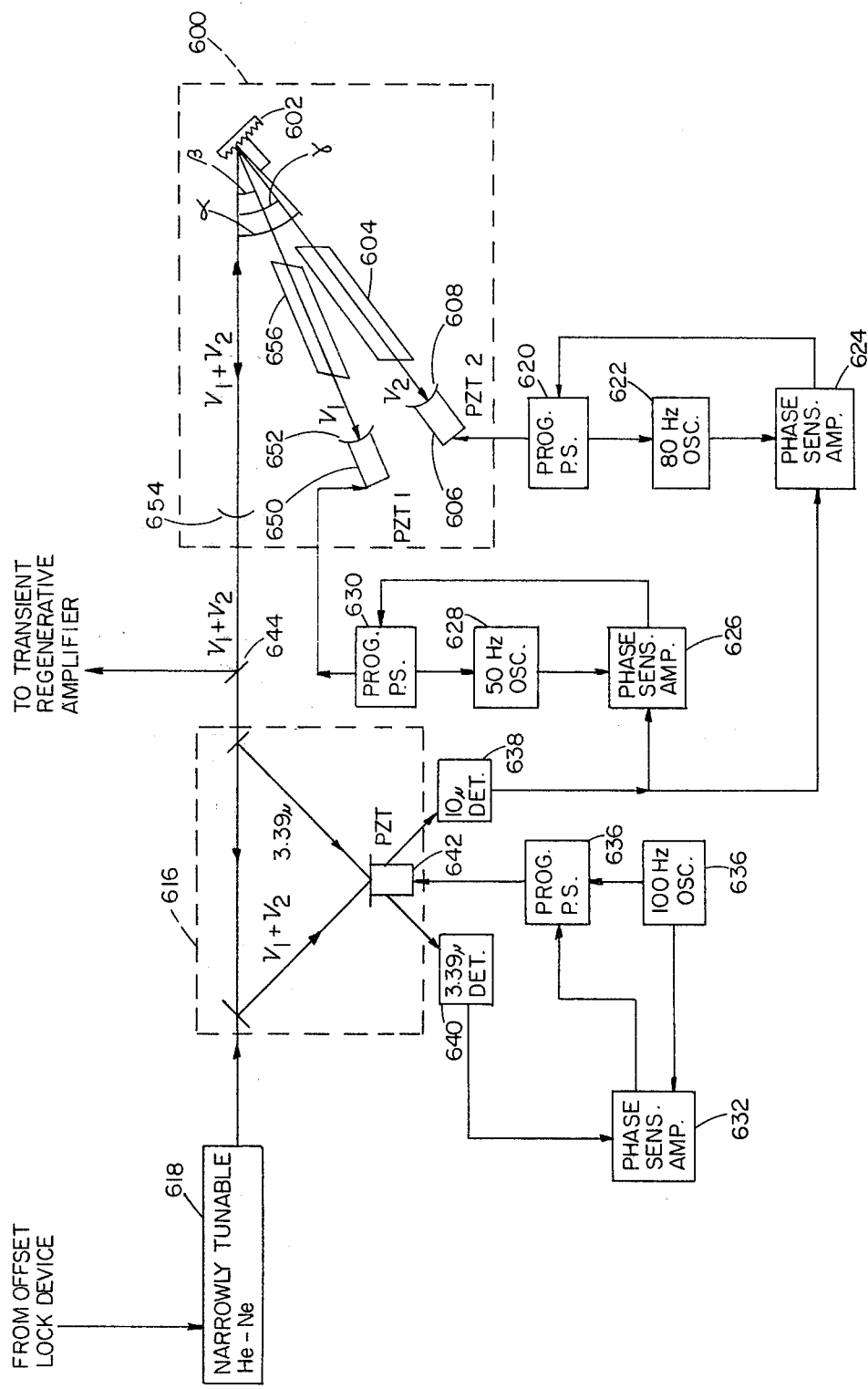
FIG. 13 shows a method of stabilizing two laser frequencies on two TRA cavity resonances.

FIG. 13 illustrates the use of a two frequency master oscillator in a TRA system. Master oscillator 600 consists of two laser amplifier tubes 656 and 604, mirrors 654, 650, 606, PZT translators 650 and 606 and diffraction grating 602. The angle $\alpha$ between the common optical axis and the normal to the grating, and angles $\beta$ and $\gamma$ defining the angular positions of mirrors 652 and 608 respectively are chosen so that the grating equation is satisfied for cavity 654, 602, 652 at the desired frequency $\nu_1$ and for cavity 654, 602, 606 at the desired frequency $\nu_2$. Separate gain tubes 656 and 604 are inserted in their respective cavities to permit simultaneous oscillation at frequencies $\nu_1$ and $\nu_2$ while avoiding competition effects. Two frequency radiation emerges from partial reflector 654 with both frequency components being co-linear. Fine frequency tuning of $\nu_1$ or $\nu_2$ may be effected independently by means of PZT's 650 and 606.

Transfer comparator 616 is similar to those previously described; its length is stabilized relative to the frequency of the narrowly tunable laser 618. Frequency changes in 618 in response to signals from the offset lock device produce corresponding length and resonant frequency changes in 616 via the loop consisting of 3.39$\mu$ detector 640, phase sensitive amplifier 632, 100 Hz oscillator 634 programmed power supply 636, and PZT 642 in the manner previously described.

Radiation from 600 at frequencies $\nu_1$ and $\nu_2$ is partially reflected to the TRA cavity via beam splitter 644 and partially transmitted into comparator 616. Some of the $\nu_1 + \nu_2$ radiation emerges from the comparator after having circulated through it and is detected by detector 638. Laser oscillations at $\nu_1$ and $\nu_2$ are modulated at 50 Hz and 80 Hz respectively by means of oscillators 628 and 622 driving programmed power supplier 630 and 620 which in turn drive PZT's 650 and 606. The electrical signal from 638, modulated at both 50 Hz and 80 Hz is sent to phase sensitive amplifier 626 referenced to 628 and phase sensitive amplifier 624 referenced to 622. Amplifier 626 senses only changes in $\nu_1$ radiation intensity and amplifier 624 senses only changes in $\nu_2$ radiation. Both feedback loops are closed in the usual way by driving programmed power supplies 630 and 620 in the appropriate sense to produce cavity length changes via PZT's 650 and 606 to independently stabilize both $\nu_1$ and $\nu_2$ relative to the comparator resonances.

If the TRA cavity and the comparator cavity have the same length and hence the same intermode frequency spacing, the stabilized radiation at $\nu_1$ and $\nu_2$ directed into TRA cavity by 644 may be brought into close resonance with two TRA cavity modes simultaneously and hence transient regenerative amplification may be obtained at both frequencies simultaneously.

I claim:

1. A pulsed laser system capable of producing pulses of radiation at relatively high peak power at a single resonator mode, said system comprising
a master laser oscillator capable of producing a beam of radiation at a desired frequency to be introduced to a power laser,
a radiation-responsive pulsed power laser oscillator including an optical resonator formed by a set of reflectors, said power laser adapted to receive periodic application of a voltage pulse, said optical resonator arranged to receive said introduced beam at least during the periodic application of said voltage pulse to said power laser whereby the frequency of radiation emitted by said power laser can be determined by the frequency of said introduced beam,
monitoring means acting between pulses of said power laser to optically monitor the resonator cavity of said power laser to determine the frequency of the resonator mode of said power laser and produce a signal dependent upon said frequency,
and stabilizing means responsive to said signal of said monitoring means to maintain the center frequency of the mode of said power laser in close coincidence with the frequency of said master oscillator.

2. The pulsed laser system of claim 1 wherein said master oscillator is adapted to produce a frequency spaced from the region of maximum gain of said power laser and said power laser having an energizing system adapted to limit the duration of energization of said power laser to the initial part of transient radiation buildup whereby the power laser output pulse can be terminated before characteristic switch of oscillation of said power laser to a frequency at the maximum gain of the power laser.

3. The pulsed laser system of claim 2 wherein said power laser oscillator is a $CO_2$ laser, and said energization system is adapted to energize said power laser oscillator for pulse periods of the order of 1 microsecond.

4. The pulsed laser system of claim 2 or 3 wherein said master oscillator is tunable and said stabilizing means is adapted to track tuning of said master oscillator to maintain the center frequency of the mode of said power laser in close coincidence with the tuned frequency of said master oscillator.

5. The pulsed laser system of claim 4 wherein the means for determining the resonator mode of said master oscillator comprises a comparator resonator, means for introducing into said comparator resonator a comparator frequency $\nu_s$ based upon said stable optical reference, means for tuning said comparator resonator to be in resonance with $\nu_s$ and means for tuning the master oscillator to be in resonance with said comparator resonator.

6. The pulsed laser system of claim 4 wherein there is a means for determining the resonator mode of said master oscillator which comprises a comparator resonator, means for monitoring the length of said comparator resonator comprising a laser plasma tube within said resonator adapted to produce laser oscillation therein, means for comparing the frequency of said comparator laser oscillation to a reference frequency to determine deviations of said laser comparator frequency therefrom and to a correction signal based upon said deviation, means to apply said correction signal to change the length of said comparator resonator to minimize said deviation signal, and means for tuning the master oscillator to be in resonance with said comparator resonator, said means for tuning comprising an electro-optical modulator receiving and modulating a portion of the master oscillator output $\nu_m$ and injecting the thus modulated signal into said comparator, a phase-sensitive detector for determining the relation between the signal transmitted through the comparator at frequency $\nu_m$ and the resonant frequency of the comparator, and means responsive to said phase-sensitive detector to vary the frequency of the master oscillator to bring it into resonance with said comparator resonator.

7. The pulsed laser system of claim 6 wherein said master oscillator is a CW $CO_2$ laser, said plasma tube is a helium neon plasma tube and said stable optical reference is a stabilized helium neon laser.

8. The pulsed laser system of claim 7 wherein the means for comparing the frequency of said comparator laser oscillation to a frequency based on said reference frequency includes a tunable helium neon laser and a variable offset lock means for tuning said tunable laser to a frequency based upon the frequency of said stabilized helium neon laser and the setting of said variable offset lock means.

9. The pulsed laser system of claim 1 wherein said monitoring means includes means to determine the frequency of the resonator mode of said power laser relative to a stable reference having an optical frequency, means also referred to said stable reference for establishing the frequency of said master oscillator.

10. The pulsed laser system of claim 1 including means to maintain resonator mode of said master oscillator and power oscillator in near coincidence.

11. The pulsed laser system of claim 10 adapted to be tunable over a range, wherein the means for controlling said resonator modes to maintain said modes in near coincidence includes respective tunable radio frequency generators for said power laser and said master oscillator, means for causing the signals from said respective radio frequency generators to vary the positions of reflectors of the respective resonators, and means for tuning said pulsed laser system by dependently varying the frequencies of said radio frequency generators based upon the respective cavity lengths of said resonators.

12. The pulsed laser system of claim 1 including means for extracting from the resonator of said pulsed power laser, between pulses of said power laser, a CW signal of frequency dependent upon the instantaneous resonant frequency of said resonator, heterodyne mixing means for mixing with said CW signal a stable reference frequency from a stable optical reference and means for generating a correction signal to stabilize the position of a reflector of the power laser resonator based upon a beat signal based upon the instantaneous frequency of the power laser resonator and said reference frequency.

13. The pulsed laser system of claim 12 adapted to be tunable over a range, said system having means for effectively mixing a tunable microwave signal $\nu_{rf}$ with said CW frequency of the power laser resonator $\nu_h$ and the reference frequency $\nu_r$ and means to position said reflector of the power laser resonator based upon the beat signal $\nu_b = \nu_{rf} + \nu_r - \nu_h$.

14. The pulsed laser system of claim 12 or 13 including discriminator means for producing a correction signal based upon the difference between said beat signal and a selected center frequency.

15. The pulsed laser system of claim 2 or 13 including gating means enabling a position correction signal to be determined and applied to a reflector of the resonator of said power laser at times removed from the pulse times of the pulsed power laser.

16. The pulsed laser system of claim 1, 12 or 13 wherein the means acting between pulses of said power laser comprises a laser means of frequency $\nu_h$ different from said power laser, said power resonator having a high Q with respect to said frequency $\nu_h$, said laser means comprising a gain tube disposed within said power laser resonator, said resonator being adapted to resonate at $\nu_h$ as well as at the lasing frequency of the pulsed laser.

17. The pulsed laser system of claim 16 wherein said pulsed laser is a $CO_2$ TEA laser, said laser means of frequency $\nu_h$ is provided by a helium neon laser gain tube within the resonator of said power laser and said stable optical reference is a stabilized helium neon laser.

18. The pulsed laser system of claim 17 wherein said comparator resonator is a ring resonator, means for injecting the comparator frequency $\nu_s$ into said comparator resonator in one direction to establish a traveling wave at $\nu_s$ in said direction, means for injecting the master oscillator frequency $\nu_m$ into said comparator resonator in the opposite direction, thereby to avoid feedback of $\nu_m$ and $\nu_s$ to their respective sources, means to compare $\nu_m$ to the cavity length of said master oscillator on the basis of said comparison.

19. The pulsed laser system of claim 17 wherein the source of said comparator frequency $\nu_s$ is a tunable laser, said tunable laser controlled by an offset lock means, said offset lock means being referred to said stable optical reference.

20. The pulsed laser system of claim 19 wherein said master oscillator is a CW $CO_2$ laser, said tunable laser source for frequency $\nu_s$ is a tunable helium neon laser and said stable optical reference is a stabilized helium neon laser.

21. The pulsed laser system of claim 19 wherein said offset lock means is variably controlled by tuning control means adapted simultaneously to tune said offset lock means and to vary the resonator mode of said power laser dependently, based upon the respective cavity lengths of said power laser and said master oscillator.

22. The pulsed laser system of claim 1 wherein said power laser resonator comprises a ring resonator adapted upon injection to establish a traveling wave circulating in the direction of the injected signal, preventing feedback to said master oscillator.

23. The pulsed laser system of claim 1 wherein said means for optically monitoring the resonator cavity of said power laser radiation from said master oscillator, said master oscillator adapted to produce a CW output, electro-optical means for examining the CW output of said resonator via an optical coupling between said electro-optical means and said resonator, and blocking means for blocking energy of said pulses from reaching said electro-optical means.

24. The pulsed laser system of claim 1, 11 or 23 including means for processing the pulsed laser output to remove chirp frequencies.

25. A pulsed laser system capable of producing pulses of radiation at relatively high peak power at a single resonator mode, said system comprising a master oscillator including an optical resonator formed by a set of reflectors and capable of producing a beam of radiation at a desired tunable frequency to serve as an injection beam, a radiation-responsive pulsed power laser oscillator including an optical resonator formed by a set of reflectors, said power laser adapted to receive periodic application of a voltage pulse, said optical resonator arranged to receive said injection beam at least during the periodic application of said voltage pulse to said power laser whereby the frequency of radiation emitted by said power laser can be determined by the frequency of said injection beam, means acting between pulses of said power laser to optically monitor the resonator cavity of said power laser to determine the frequency of the resonator mode of said power laser relative to a stable reference having an optical frequency, means also referred to said stable reference for determining the frequency of the resonator mode of said master oscillator, means to maintain said modes in near coincidence, and heterodyne means for processing the pulsed output of said pulsed power laser to provide an output substantially free of fluctuations over a short interval.

26. The system of claim 25 wherein the pulsed output of said power laser comprises optical radiation at a frequency, $\omega$, that can chirp over a short interval, said system including means to provide an output free of said chirp comprising modulation signal generating means responsive to the output pulses of frequency $\omega$ of said power laser and adapted to generate a modulation signal, said modulation signal generating means including a non-linear mixing element, means for applying to said mixing element a portion of said output pulse of frequency $\omega$ and an input from a reference source for optical radiation having higher frequency-stability than that of said output of frequency $\omega$, said mixing element adapted to mix said inputs, said mixing element characterized by a high speed of response sufficient to produce a difference signal at a frequency $\omega_m$, corresponding to the instantaneous difference in frequency of said outputs, and means for generating from said difference signal a modulation signal of said frequency $\omega_m$ and of amplitude substantially higher than that of said difference signal, and an electro-optical modulator for generating the desired stable optical radiation, said modulator having as inputs said optical radiation of frequency $\omega$ from said power laser and said modulation signal of frequency $\omega_m$, and said modulator having as an output an optical sideband of said power laser frequency $\omega$ that is free of fluctuations that are present in said power laser frequency $\omega$.

27. The system of claim 26 wherein said reference source comprises said master oscillator.

28. The system of claim 26 wherein said means for generating said modulation signal from said difference signal comprises a broad band radio frequency amplifier.

29. The system of claim 28 wherein said radio frequency amplifier is of the pulsed type timed to operate in synchronism with said pulsed power laser.

30. The system of claim 26 wherein said power laser is a $CO_2$ TEA laser.

31. The system of claim 26 arranged to provide probing radiation for transmittal through space to an external reflecting medium, in combination with Lidar return signal processing means adapted to process return reflection of said probing radiation based upon the time of transit of said probing radiation to and return from said reflecting medium, whereby a Lidar system is provided.

32. The Lidar system of claim 31 wherein means are provided to employ a portion of the output of said master oscillator as a local oscillator, and means for comparison of said return reflection of said probing radiation to said local oscillator.

* * * * *

UNITED STATES PATENT OFFICE
CERTIFICATE OF CORRECTION

Patent No. 4,410,992   Dated October 18, 1983

Inventor(s)  Ali Javan

It is certified that error appears in the above-identified patent and that said Letters Patent are hereby corrected as shown below:

Col. 12, line 6 ",anner." should be --manner.--.

Col. 13, line 36 "nd" should be --and--.

Col. 14, line 51 "therefor" should be --therefore--.

Col. 15, line 2-3 (in italics) "1 is maintained on the peak of the cavity resonance of reference resonator 74." should be (without italics) --is maintained on the peak of the cavity resonance of reference resonator 74.--

Col. 16, line 63 "resonster" should be --resonator--.

Col. 17, line 60, "$\mu_s$" should be --$\nu_s$--.

Col. 17, line 61, "comparators" should be --comparator--.

Col. 18, line 5 "316" should be --216--.

Col. 26, line 34 after "laser" insert --employs--.

Signed and Sealed this

Twentieth Day of November 1984

[SEAL]

Attest:

GERALD J. MOSSINGHOFF

Attesting Officer   Commissioner of Patents and Trademarks